(12) United States Patent
Schneck et al.

(10) Patent No.: US 8,833,663 B2
(45) Date of Patent: *Sep. 16, 2014

(54) IMAGE PROCESSING TECHNIQUES FOR PRINTING IDENTIFICATION CARDS AND DOCUMENTS

(75) Inventors: Nelson T. Schneck, Hollis, NH (US);
Charles F. Duggan, Merrimack, NH (US); Robert L. Jones, Andover, MA (US); Daoshen Bi, Boxborough, MA (US)

(73) Assignee: L-1 Secure Credentialing, Inc., Billerica, MA (US)

( * ) Notice: Subject to any disclaimer, the term of this patent is extended or adjusted under 35 U.S.C. 154(b) by 355 days.

This patent is subject to a terminal disclaimer.

(21) Appl. No.: 12/906,614

(22) Filed: Oct. 18, 2010

(65) Prior Publication Data

US 2011/0123132 A1 May 26, 2011

Related U.S. Application Data

(63) Continuation of application No. 10/411,354, filed on Apr. 9, 2003, now Pat. No. 7,815,124.

(60) Provisional application No. 60/371,335, filed on Apr. 9, 2002, provisional application No. 60/429,115, filed on Nov. 25, 2002.

(51) Int. Cl.
| | | |
|---|---|---|
| *H04N 1/40* | (2006.01) | |
| *H04N 1/405* | (2006.01) | |
| *G06K 15/00* | (2006.01) | |
| *G06K 19/00* | (2006.01) | |
| *G06K 19/06* | (2006.01) | |
| *G06K 7/10* | (2006.01) | |
| *G06K 5/00* | (2006.01) | |
| *H04N 7/167* | (2011.01) | |
| *G06K 9/00* | (2006.01) | |
| *B42D 25/00* | (2014.01) | |
| *B41M 3/14* | (2006.01) | |
| *H04N 1/32* | (2006.01) | |

(52) U.S. Cl.
CPC ........ *H04N 1/32133* (2013.01); *B42D 2035/18* (2013.01); *B42D 2035/38* (2013.01); *B42D 15/10* (2013.01); *B41M 3/144* (2013.01); *H04N 2201/327* (2013.01); *H04N 2201/3233* (2013.01); *H04N 1/32144* (2013.01); *B42D 2031/08* (2013.01); *B42D 2035/40* (2013.01); *H04N 2201/3236* (2013.01); *H04N 2201/3271* (2013.01)
USPC ........... 235/487; 235/491; 235/494; 235/380; 235/457; 380/232; 382/100; 358/3.01; 358/3.06; 358/3.13

(58) Field of Classification Search
USPC ........................ 235/487, 491, 494, 380, 457; 358/3.01–3.19; 380/232; 382/100
See application file for complete search history.

(56) References Cited

U.S. PATENT DOCUMENTS

| | | |
|---|---|---|
| 2,815,310 A | 12/1957 | Anderson |
| 2,957,830 A | 10/1960 | Paul |
| 3,153,166 A | 10/1964 | Thornton |
| 3,225,457 A | 12/1965 | Alexander |
| 3,238,595 A | 3/1966 | Schwartz |
| 3,413,171 A | 11/1968 | Hannon |
| 3,496,262 A | 2/1970 | Long |
| 3,571,957 A | 3/1971 | Cumming |
| 3,582,439 A | 6/1971 | Thomas |
| 3,601,913 A | 8/1971 | Pollock |
| 3,614,430 A | 10/1971 | Berler |
| 3,614,839 A | 10/1971 | Thomas |
| 3,758,970 A | 9/1973 | Annenberg |
| 3,802,101 A | 4/1974 | Scantlin |
| 3,860,558 A | 1/1975 | Klemchuk |
| 3,914,484 A | 10/1975 | Creegan |
| 3,929,701 A | 12/1975 | Hall |
| 3,932,036 A | 1/1976 | Ueda |
| 3,949,501 A | 4/1976 | Andrews |
| 3,953,869 A | 4/1976 | Wah |
| 3,961,956 A | 6/1976 | Fukuda |
| 3,975,291 A | 8/1976 | Claussen |
| 3,987,711 A | 10/1976 | Silver |
| 4,035,740 A | 7/1977 | Schafer |

| | | | | | | |
|---|---|---|---|---|---|---|
| 4,051,374 | A | 9/1977 | Drexhage | 4,816,372 | A | 3/1989 | Schenk |
| 4,072,911 | A | 2/1978 | Walther | 4,816,374 | A | 3/1989 | Lecomte |
| 4,082,873 | A | 4/1978 | Williams | 4,822,973 | A | 4/1989 | Fahner |
| 4,096,015 | A | 6/1978 | Kawamata | 4,841,134 | A | 6/1989 | Hida |
| 4,100,509 | A | 7/1978 | Walther | 4,859,361 | A | 8/1989 | Reilly |
| 4,104,555 | A | 8/1978 | Fleming | 4,861,620 | A | 8/1989 | Azuma |
| 4,119,361 | A | 10/1978 | Greenaway | 4,866,025 | A | 9/1989 | Byers |
| 4,121,003 | A | 10/1978 | Williams | 4,866,027 | A | 9/1989 | Henzel |
| 4,131,337 | A | 12/1978 | Moraw | 4,871,714 | A | 10/1989 | Byers |
| 4,155,618 | A | 5/1979 | Regnault | 4,876,234 | A | 10/1989 | Henzel |
| 4,171,766 | A | 10/1979 | Ruell | 4,876,237 | A | 10/1989 | Byers |
| 4,184,701 | A | 1/1980 | Franklin | 4,878,167 | A | 10/1989 | Kapulka |
| 4,256,900 | A | 3/1981 | Raue | 4,879,747 | A | 11/1989 | Leighton |
| 4,270,130 | A | 5/1981 | Houle | 4,889,749 | A | 12/1989 | Ohashi |
| 4,271,395 | A | 6/1981 | Brinkmann | 4,891,351 | A | 1/1990 | Byers |
| 4,274,062 | A | 6/1981 | Brinkmann | 4,894,110 | A | 1/1990 | Lass |
| 4,289,957 | A | 9/1981 | Neyroud | 4,183,989 | B1 | 5/1990 | Tooth |
| 4,301,091 | A | 11/1981 | Schieder | 4,931,793 | A | 6/1990 | Fuhrmann |
| 4,304,809 | A | 12/1981 | Moraw | 4,935,335 | A | 6/1990 | Fotland |
| 4,317,782 | A | 3/1982 | Eckstein | 4,959,406 | A | 9/1990 | Foltin |
| 4,324,421 | A | 4/1982 | Moraw | 4,964,066 | A | 10/1990 | Yamane |
| 4,326,066 | A | 4/1982 | Eckstein | 4,968,063 | A | 11/1990 | McConville |
| 4,338,258 | A | 7/1982 | Brinkwerth | 4,972,476 | A | 11/1990 | Nathans |
| 4,356,052 | A | 10/1982 | Moraw | 4,990,759 | A | 2/1991 | Gloton |
| 4,359,633 | A | 11/1982 | Bianco | 4,994,831 | A | 2/1991 | Marandi |
| 4,360,548 | A | 11/1982 | Skees | 4,999,065 | A | 3/1991 | Wilfert |
| 4,384,973 | A | 5/1983 | Harnisch | 5,005,872 | A | 4/1991 | Lass |
| 4,415,225 | A | 11/1983 | Benton | 5,005,873 | A | 4/1991 | West |
| 4,417,784 | A | 11/1983 | Knop | 5,006,503 | A | 4/1991 | Byers |
| 4,428,997 | A | 1/1984 | Shulman | 5,011,816 | A | 4/1991 | Byers |
| 4,443,438 | A | 4/1984 | Kasamatsu | 5,013,900 | A | 5/1991 | Hoppe |
| 4,450,024 | A | 5/1984 | Haghiri | 5,024,989 | A | 6/1991 | Chiang |
| 4,467,209 | A | 8/1984 | Maurer | 5,051,147 | A | 9/1991 | Anger |
| 4,468,468 | A | 8/1984 | Benninghoven | 5,058,926 | A | 10/1991 | Drower |
| 4,506,148 | A | 3/1985 | Berthold | 5,060,981 | A | 10/1991 | Fossum |
| 4,507,346 | A | 3/1985 | Maurer | 5,061,341 | A | 10/1991 | Kildal |
| 4,510,311 | A | 4/1985 | Eckstein | 4,869,946 | B1 | 11/1991 | Clay |
| 4,522,881 | A | 6/1985 | Kobayashi | 5,062,341 | A | 11/1991 | Reiling |
| 4,523,777 | A | 6/1985 | Holbein | 5,066,947 | A | 11/1991 | Du |
| 4,527,059 | A | 7/1985 | Benninghoven | 5,075,195 | A | 12/1991 | Babler |
| 4,529,992 | A | 7/1985 | Ishida | 5,079,411 | A | 1/1992 | Lee |
| 4,544,181 | A | 10/1985 | Maurer | 5,087,507 | A | 2/1992 | Heinzer |
| 4,551,265 | A | 11/1985 | Brinkwerth | 5,089,350 | A | 2/1992 | Talvalkar |
| 4,568,824 | A | 2/1986 | Gareis | 4,687,526 | B1 | 3/1992 | Wilfert |
| 4,579,754 | A | 4/1986 | Maurer | 5,099,422 | A | 3/1992 | Foresman |
| 4,590,366 | A | 5/1986 | Rothfjell | 5,100,711 | A | 3/1992 | Satake |
| 4,596,409 | A | 6/1986 | Holbein | 5,113,445 | A | 5/1992 | Wang |
| 4,597,592 | A | 7/1986 | Maurer | 5,122,813 | A | 6/1992 | Lass |
| 4,597,593 | A | 7/1986 | Maurer | 5,128,779 | A | 7/1992 | Mallik |
| 4,599,259 | A | 7/1986 | Kobayashi | 5,128,859 | A | 7/1992 | Carbone |
| 4,617,216 | A | 10/1986 | Haghiri | 5,138,070 | A | 8/1992 | Berneth |
| 4,621,271 | A | 11/1986 | Brownstein | 5,138,604 | A | 8/1992 | Umeda |
| 4,627,997 | A | 12/1986 | Ide | 5,156,938 | A | 10/1992 | Foley |
| 4,629,215 | A | 12/1986 | Maurer | 5,157,424 | A | 10/1992 | Craven |
| 4,638,289 | A | 1/1987 | Zottnik | 5,169,155 | A | 12/1992 | Soules |
| 4,652,722 | A | 3/1987 | Stone | 5,169,707 | A | 12/1992 | Faykish |
| 4,653,775 | A | 3/1987 | Raphael | 5,171,625 | A | 12/1992 | Newton |
| 4,653,862 | A | 3/1987 | Morozumi | 5,172,281 | A | 12/1992 | Ardis |
| 4,654,290 | A | 3/1987 | Spanjer | 5,173,840 | A | 12/1992 | Kodai |
| 4,656,585 | A | 4/1987 | Stephenson | 5,179,392 | A | 1/1993 | Kawaguchi |
| 4,663,518 | A | 5/1987 | Borror | 5,180,309 | A | 1/1993 | Egnor |
| 4,670,882 | A | 6/1987 | Telle | 5,191,522 | A | 3/1993 | Bosco |
| 4,672,891 | A | 6/1987 | Maurer | 5,201,044 | A | 4/1993 | Frey |
| 4,675,746 | A | 6/1987 | Tetrick | 5,208,450 | A | 5/1993 | Uenishi |
| 4,689,477 | A | 8/1987 | Goldman | 5,212,030 | A * | 5/1993 | Figov ........................ 430/49.43 |
| 4,709,384 | A | 11/1987 | Schiller | 5,215,864 | A | 6/1993 | Laakmann |
| 4,711,690 | A | 12/1987 | Haghiri | 5,216,543 | A | 6/1993 | Calhoun |
| 4,732,410 | A | 3/1988 | Holbein | 5,224,173 | A | 6/1993 | Kuhns |
| 4,735,670 | A | 4/1988 | Maurer | 5,233,513 | A | 8/1993 | Doyle |
| 4,738,949 | A | 4/1988 | Sethi | 5,237,164 | A | 8/1993 | Takada |
| 4,748,452 | A | 5/1988 | Maurer | 5,243,524 | A | 9/1993 | Ishida |
| 4,751,525 | A | 6/1988 | Robinson | 5,249,546 | A | 10/1993 | Pennelle |
| 4,754,128 | A | 6/1988 | Takeda | 5,250,492 | A | 10/1993 | Dotson |
| 4,765,636 | A | 8/1988 | Speer | 5,261,987 | A | 11/1993 | Luening |
| 4,765,656 | A | 8/1988 | Becker | 5,267,755 | A | 12/1993 | Yamauchi |
| 4,766,026 | A | 8/1988 | Lass | 5,272,039 | A | 12/1993 | Yoerger |
| 4,773,677 | A | 9/1988 | Plasse | 5,276,478 | A | 1/1994 | Morton |
| 4,790,566 | A | 12/1988 | Boissier | 5,284,364 | A | 2/1994 | Jain |
| 4,803,114 | A | 2/1989 | Schledorn | 5,294,774 | A | 3/1994 | Stone |

| | | | | | | |
|---|---|---|---|---|---|---|
| 5,294,944 A | 3/1994 | Takeyama | | 5,669,995 A | 9/1997 | Hong |
| 5,298,922 A | 3/1994 | Merkle | | 5,671,005 A | 9/1997 | McNay |
| 5,301,981 A | 4/1994 | Nesis | | 5,681,356 A | 10/1997 | Barak |
| 5,304,513 A | 4/1994 | Haghiri | | 5,683,774 A | 11/1997 | Faykish |
| 5,304,789 A | 4/1994 | Lob | | 5,688,738 A | 11/1997 | Lu |
| 5,308,736 A | 5/1994 | Defieuw | | 5,689,706 A | 11/1997 | Rao |
| 5,317,503 A | 5/1994 | Inoue | | 5,691,757 A | 11/1997 | Hayashihara |
| 5,319,453 A | 6/1994 | Copriviza | | 5,694,471 A | 12/1997 | Chen |
| 5,321,751 A | 6/1994 | Ray | | 5,696,705 A | 12/1997 | Zykan |
| 5,334,573 A | 8/1994 | Schild | | 5,697,006 A | 12/1997 | Taguchi |
| 5,336,657 A | 8/1994 | Egashira | | 5,698,296 A | 12/1997 | Dotson |
| 5,351,302 A | 9/1994 | Leighton | | 5,700,037 A | 12/1997 | Keller |
| 5,374,675 A | 12/1994 | Plachetta | | 5,710,834 A | 1/1998 | Rhoads |
| 5,379,345 A | 1/1995 | Greenberg | | 5,712,731 A | 1/1998 | Drinkwater |
| 5,380,044 A | 1/1995 | Aitkens | | 5,714,291 A | 2/1998 | Marinello |
| 5,380,695 A | 1/1995 | Chiang | | 5,717,018 A | 2/1998 | Magerstedt |
| 5,384,846 A | 1/1995 | Berson | | 5,717,391 A | 2/1998 | Rodriguez |
| 5,386,566 A | 1/1995 | Hamanaka | | 5,719,667 A | 2/1998 | Miers |
| 5,387,013 A | 2/1995 | Yamauchi | | 5,719,948 A | 2/1998 | Liang |
| 5,393,099 A | 2/1995 | D Amato | | 5,721,781 A | 2/1998 | Deo |
| 5,394,555 A | 2/1995 | Hunter | | 5,721,788 A | 2/1998 | Powell |
| 5,396,559 A | 3/1995 | McGrew | | 5,742,411 A | 4/1998 | Walters |
| 5,409,797 A | 4/1995 | Hosoi | | 5,745,308 A | 4/1998 | Spangenberg |
| 5,410,142 A | 4/1995 | Tsuboi | | 5,745,901 A | 4/1998 | Entner |
| 5,421,619 A | 6/1995 | Dyball | | 5,748,783 A | 5/1998 | Rhoads |
| 5,421,869 A | 6/1995 | Gundjian | | 5,760,386 A | 6/1998 | Ward |
| 5,422,213 A | 6/1995 | Yu | | 5,763,868 A | 6/1998 | Kubota |
| 5,422,230 A | 6/1995 | Boggs | | 5,764,263 A | 6/1998 | Lin |
| 5,424,119 A | 6/1995 | Phillips | | 5,767,496 A | 6/1998 | Swartz |
| 5,432,864 A | 7/1995 | Lu | | 5,768,001 A | 6/1998 | Kelley |
| 5,434,994 A | 7/1995 | Shaheen | | 5,768,426 A | 6/1998 | Rhoads |
| 5,435,599 A | 7/1995 | Bernecker | | 5,768,505 A | 6/1998 | Gilchrist |
| 5,436,970 A | 7/1995 | Ray | | 5,768,506 A | 6/1998 | Randell |
| 5,446,659 A | 8/1995 | Yamawaki | | 5,769,301 A | 6/1998 | Hebert |
| 5,449,200 A | 9/1995 | Andric | | B155,054 I5 | 9/1998 | Belluci |
| 5,450,504 A | 9/1995 | Calia | | 5,862,262 A * | 1/1999 | Jacobs et al. ................... 382/249 |
| 5,451,478 A | 9/1995 | Boggs | | 5,635,012 B1 | 8/1999 | Belluci |
| 5,454,598 A | 10/1995 | Wicker | | 5,471,533 B1 | 4/2000 | Wang |
| 5,455,947 A | 10/1995 | Suzuki | | 5,337,361 A1 | 5/2001 | Wang |
| 5,458,713 A | 10/1995 | Ojster | | 5,636,292 C1 | 6/2002 | Rhoads |
| 5,463,212 A | 10/1995 | Oshima | | 6,542,622 B1 * | 4/2003 | Nelson et al. ................. 382/112 |
| 5,466,012 A | 11/1995 | Puckett | | 6,608,911 B2 * | 8/2003 | Lofgren et al. ............... 382/100 |
| 5,474,875 A | 12/1995 | Loerzer | | 6,707,578 B1 * | 3/2004 | Bradburn ..................... 358/3.07 |
| 5,483,442 A | 1/1996 | Black | | 6,834,124 B1 * | 12/2004 | Lin et al. ....................... 382/261 |
| 5,483,632 A | 1/1996 | Kuwamoto | | 6,842,268 B1 * | 1/2005 | van Strijp et al. ............ 358/3.06 |
| 5,489,639 A | 2/1996 | Faber | | 7,063,264 B2 * | 6/2006 | Bi et al. ......................... 235/487 |
| 5,490,217 A | 2/1996 | Wang | | 7,602,531 B2 * | 10/2009 | Bailey et al. ................. 358/3.15 |
| 5,499,330 A | 3/1996 | Lucas | | 7,815,124 B2 * | 10/2010 | Schneck et al. ............... 235/491 |
| 5,504,674 A | 4/1996 | Chen | | 8,033,477 B2 * | 10/2011 | Jones et al. .................... 235/492 |
| 5,509,693 A | 4/1996 | Kohls | | 2001/0002035 A1 | 5/2001 | Kayanakis |
| 5,514,860 A | 5/1996 | Berson | | 2001/0013395 A1 | 8/2001 | Pourmand |
| 5,516,362 A | 5/1996 | Gundjian | | 2001/0037223 A1 | 11/2001 | Beery |
| 5,522,623 A | 6/1996 | Soules | | 2001/0037455 A1 | 11/2001 | Lawandy |
| 5,523,125 A | 6/1996 | Kennedy | | 2002/0007289 A1 | 1/2002 | Malin |
| 5,523,942 A | 6/1996 | Tyler | | 2002/0018430 A1 | 2/2002 | Heckenkamp |
| 5,524,489 A | 6/1996 | Twigg | | 2002/0020832 A1 | 2/2002 | Oka |
| 5,525,403 A | 6/1996 | Kawabata | | 2002/0021001 A1 | 2/2002 | Stratford |
| 5,529,345 A | 6/1996 | Kohls | | 2002/0027359 A1 | 3/2002 | Cobben |
| 5,532,104 A | 7/1996 | Goto | | 2002/0030587 A1 | 3/2002 | Jackson |
| 5,534,372 A | 7/1996 | Koshizuka | | 2002/0034319 A1 | 3/2002 | Tumey |
| 5,550,346 A | 8/1996 | Andriash | | 2002/0035488 A1 | 3/2002 | Aquila |
| 5,550,976 A | 8/1996 | Henderson | | 2002/0049619 A1 | 4/2002 | Wahlbin |
| 5,560,799 A | 10/1996 | Jacobsen | | 2002/0051569 A1 * | 5/2002 | Kita .............................. 382/167 |
| 5,573,584 A | 11/1996 | Ostertag | | 2002/0055860 A1 | 5/2002 | Wahlbin |
| 5,576,377 A | 11/1996 | El | | 2002/0055861 A1 | 5/2002 | King |
| 5,579,694 A | 12/1996 | Mailloux | | 2002/0059083 A1 | 5/2002 | Wahlbin |
| 5,586,310 A | 12/1996 | Sharman | | 2002/0059084 A1 | 5/2002 | Wahlbin |
| 5,629,093 A | 5/1997 | Bischof | | 2002/0059085 A1 | 5/2002 | Wahlbin |
| 5,629,512 A | 5/1997 | Haga | | 2002/0059086 A1 | 5/2002 | Wahlbin |
| 5,633,119 A | 5/1997 | Burberry | | 2002/0059087 A1 | 5/2002 | Wahlbin |
| 5,637,447 A * | 6/1997 | Dickerson et al. ............ 430/567 | | 2002/0059097 A1 | 5/2002 | Wahlbin |
| 5,638,508 A | 6/1997 | Kanai | | 2002/0062232 A1 | 5/2002 | Wahlbin |
| 5,639,819 A | 6/1997 | Farkas | | 2002/0062233 A1 | 5/2002 | Wahlbin |
| 5,646,997 A | 7/1997 | Barton | | 2002/0062234 A1 | 5/2002 | Wahlbin |
| 5,652,626 A | 7/1997 | Kawakami | | 2002/0062235 A1 | 5/2002 | Wahlbin |
| 5,654,105 A | 8/1997 | Obringer | | 2002/0069091 A1 | 6/2002 | Wahlbin |
| 5,658,411 A | 8/1997 | Faykish | | 2002/0069092 A1 | 6/2002 | Wahlbin |
| 5,659,726 A | 8/1997 | Sandford | | 2002/0070280 A1 | 6/2002 | Ikefuji |
| 5,667,716 A * | 9/1997 | Ziolo et al. ................. 252/62.52 | | 2002/0077380 A1 | 6/2002 | Wessels |

| | | |
|---|---|---|
| 2002/0080992 A1 | 6/2002 | Decker |
| 2002/0080994 A1 | 6/2002 | Lofgren |
| 2002/0082873 A1 | 6/2002 | Wahlbin |
| 2002/0087363 A1 | 7/2002 | Wahlbin |
| 2002/0106494 A1 | 8/2002 | Roth |
| 2002/0116330 A1 | 8/2002 | Hed |
| 2002/0128881 A1 | 9/2002 | Wahlbin |
| 2002/0136448 A1 | 9/2002 | Bortolussi |
| 2002/0145652 A1 | 10/2002 | Lawrence |
| 2002/0146549 A1 | 10/2002 | Kranenburg |
| 2002/0166635 A1 | 11/2002 | Sasaki |
| 2002/0170966 A1 | 11/2002 | Hannigan |
| 2002/0187215 A1 | 12/2002 | Trapani |
| 2002/0194476 A1 | 12/2002 | Lewis |
| 2003/0002710 A1 | 1/2003 | Rhoads |
| 2003/0031340 A1 | 2/2003 | Alattar |
| 2003/0031348 A1 | 2/2003 | Kuepper |
| 2003/0034319 A1 | 2/2003 | Meherin |
| 2003/0038174 A1 | 2/2003 | Jones |
| 2003/0052680 A1 | 3/2003 | Konijn |
| 2003/0055638 A1 | 3/2003 | Burns |
| 2003/0056499 A1 | 3/2003 | Binder |
| 2003/0056500 A1 | 3/2003 | Huynh |
| 2003/0059124 A1 | 3/2003 | Center |
| 2003/0062421 A1 | 4/2003 | Bloomberg |
| 2003/0099379 A1 | 5/2003 | Monk |
| 2003/0114972 A1 | 6/2003 | Takafuji |
| 2003/0115459 A1 | 6/2003 | Monk |
| 2003/0117262 A1 | 6/2003 | Anderegg |
| 2003/0126121 A1 | 7/2003 | Khan |
| 2003/0128862 A1 | 7/2003 | Decker |
| 2003/0141358 A1 | 7/2003 | Hudson |
| 2003/0161507 A1 | 8/2003 | Lawandy |
| 2003/0173406 A1* | 9/2003 | Bi et al. .................. 235/491 |
| 2003/0178487 A1 | 9/2003 | Rogers |
| 2003/0178495 A1 | 9/2003 | Jones |
| 2003/0183695 A1 | 10/2003 | Labrec |
| 2003/0188659 A1 | 10/2003 | Merry |
| 2003/0200123 A1 | 10/2003 | Burge |
| 2003/0211296 A1 | 11/2003 | Jones |
| 2003/0226897 A1 | 12/2003 | Jones |
| 2003/0234286 A1 | 12/2003 | Labrec |
| 2003/0234292 A1 | 12/2003 | Jones |
| 2004/0011874 A1 | 1/2004 | Theodossiou |
| 2004/0024694 A1 | 2/2004 | Lawrence |
| 2004/0030587 A1 | 2/2004 | Danico |
| 2004/0036574 A1 | 2/2004 | Bostrom |
| 2004/0049409 A1 | 3/2004 | Wahlbin |
| 2004/0054556 A1 | 3/2004 | Wahlbin |
| 2004/0054557 A1 | 3/2004 | Wahlbin |
| 2004/0054558 A1 | 3/2004 | Wahlbin |
| 2004/0054559 A1 | 3/2004 | Wahlbin |
| 2004/0066441 A1 | 4/2004 | Jones |
| 2004/0074973 A1* | 4/2004 | Schneck et al. ........... 235/488 |
| 2004/0076310 A1 | 4/2004 | Hersch |
| 2004/0093349 A1 | 5/2004 | Buinevicius |
| 2004/0102984 A1 | 5/2004 | Wahlbin |
| 2004/0102985 A1 | 5/2004 | Wahlbin |
| 2004/0103004 A1 | 5/2004 | Wahlbin |
| 2004/0103005 A1 | 5/2004 | Wahlbin |
| 2004/0103006 A1 | 5/2004 | Wahlbin |
| 2004/0103007 A1 | 5/2004 | Wahlbin |
| 2004/0103008 A1 | 5/2004 | Wahlbin |
| 2004/0103009 A1 | 5/2004 | Wahlbin |
| 2004/0103010 A1 | 5/2004 | Wahlbin |
| 2004/0111301 A1 | 6/2004 | Wahlbin |
| 2004/0133582 A1 | 7/2004 | Howard |
| 2004/0198858 A1 | 10/2004 | Labrec |
| 2004/0213437 A1 | 10/2004 | Howard |
| 2004/0243567 A1 | 12/2004 | Levy |
| 2004/0245346 A1 | 12/2004 | Haddock |
| 2005/0001419 A1 | 1/2005 | Levy |
| 2005/0003297 A1 | 1/2005 | Labrec |
| 2005/0010776 A1 | 1/2005 | Kenen |
| 2005/0035589 A1 | 2/2005 | Richardson |
| 2005/0060205 A1 | 3/2005 | Woods |
| 2005/0072849 A1 | 4/2005 | Jones |
| 2005/0095408 A1 | 5/2005 | LaBrec |
| 2005/0160294 A1 | 7/2005 | LaBrec |

| | | |
|---|---|---|
| 2005/0161512 A1* | 7/2005 | Jones et al. .................. 235/487 |
| 2005/0192850 A1 | 9/2005 | Lorenz |
| 2006/0027667 A1 | 2/2006 | Jones |
| 2006/0039581 A1 | 2/2006 | Decker |
| 2007/0152067 A1* | 7/2007 | Bi et al. ...................... 235/487 |
| 2007/0158939 A1 | 7/2007 | Jones |
| 2007/0187515 A1 | 8/2007 | Theodossiou |
| 2007/0223044 A1* | 9/2007 | Bailey et al. ................. 358/3.06 |
| 2011/0057040 A1* | 3/2011 | Jones et al. .................. 235/487 |

FOREIGN PATENT DOCUMENTS

| | | |
|---|---|---|
| CA | 2470094 | 6/2003 |
| CA | 2469956 | 7/2003 |
| CN | 1628318 | 6/2005 |
| DE | 2943436 | 5/1981 |
| DE | 3738636 | 6/1988 |
| DE | 9315294 | 3/1994 |
| DE | 69406213 | 3/1998 |
| EP | 0157568 | 10/1985 |
| EP | 190997 A | 8/1986 |
| EP | 0233296 | 8/1987 |
| EP | 0279104 | 8/1988 |
| EP | 0280773 | 9/1988 |
| EP | 0356980 | 3/1990 |
| EP | 0356981 | 3/1990 |
| EP | 0356982 | 3/1990 |
| EP | 0362640 | 4/1990 |
| EP | 0366075 A | 5/1990 |
| EP | 0366923 | 5/1990 |
| EP | 0373572 | 6/1990 |
| EP | 0374835 | 6/1990 |
| EP | 0420613 | 4/1991 |
| EP | 0446834 | 9/1991 |
| EP | 0446846 | 9/1991 |
| EP | 0465018 | 1/1992 |
| EP | 0479265 | 4/1992 |
| EP | 0523304 | 1/1993 |
| EP | 0539001 | 4/1993 |
| EP | 629972 | 12/1994 |
| EP | 0636495 | 2/1995 |
| EP | 0637514 | 2/1995 |
| EP | 0649754 | 4/1995 |
| EP | 0696518 | 2/1996 |
| EP | 0697433 | 2/1996 |
| EP | 0734870 | 10/1996 |
| EP | 0736860 | 10/1996 |
| EP | 0739748 | 10/1996 |
| EP | 642060 B1 | 3/1999 |
| EP | 0926608 | 6/1999 |
| EP | 0982149 | 3/2000 |
| EP | 0991014 | 4/2000 |
| EP | 1013463 | 6/2000 |
| EP | 1017016 | 7/2000 |
| EP | 1035503 | 9/2000 |
| EP | 1046515 | 10/2000 |
| EP | 1110750 A | 6/2001 |
| EP | 0464268 | 1/2002 |
| EP | 1410315 | 5/2006 |
| EP | 1909971 B1 | 4/2008 |
| GB | 1088318 | 10/1967 |
| GB | 1213193 | 11/1970 |
| GB | 1472581 | 5/1977 |
| GB | 2132136 | 7/1984 |
| GB | 2227570 | 8/1990 |
| GB | 2240948 | 8/1991 |
| JP | 63146909 | 6/1988 |
| JP | 63146909 A | 6/1988 |
| JP | 03126589 | 5/1991 |
| JP | 3185585 | 8/1991 |
| JP | 06234289 | 8/1994 |
| JP | 6234289 | 8/1994 |
| JP | 6234289 A | 8/1994 |
| JP | 07088974 | 4/1995 |
| JP | 7088974 B2 | 9/1995 |
| JP | 09064545 A | 3/1997 |
| JP | 9064545 A | 3/1997 |
| JP | 10197285 | 7/1998 |
| JP | 10197285 A | 7/1998 |

| | | |
|---|---|---|
| JP | 10214283 | 8/1998 |
| JP | 10214283 A | 8/1998 |
| JP | 11161711 | 6/1999 |
| JP | 11161711 A | 6/1999 |
| JP | 11259620 | 9/1999 |
| JP | 11259620 A | 9/1999 |
| JP | 11301121 | 11/1999 |
| JP | 11301121 A | 11/1999 |
| JP | 11321166 | 11/1999 |
| JP | 11321166 A | 11/1999 |
| JP | 03185585 B2 | 7/2001 |
| JP | 2004355659 | 12/2004 |
| JP | 2004355659 A | 12/2004 |
| JP | 2005525254 | 8/2005 |
| JP | 2005525254 T | 8/2005 |
| JP | 2005525949 | 9/2005 |
| JP | 2005525949 T | 9/2005 |
| JP | 2005276238 | 10/2005 |
| JP | 2005276238 A | 10/2005 |
| JP | 2006190331 | 7/2006 |
| JP | 2006190331 A | 7/2006 |
| WO | WO8204149 | 11/1982 |
| WO | WO8900319 | 1/1989 |
| WO | WO91/16722 | 10/1991 |
| WO | WO9513597 | 5/1995 |
| WO | WO96/03286 | 2/1996 |
| WO | WO97/01446 | 1/1997 |
| WO | WO97/18092 | 5/1997 |
| WO | WO97/32733 | 9/1997 |
| WO | WO98/19869 | 5/1998 |
| WO | WO9830224 | 7/1998 |
| WO | WO9924934 | 5/1999 |
| WO | WO00/10116 | 2/2000 |
| WO | WO00/43214 | 7/2000 |
| WO | WO0043215 | 7/2000 |
| WO | WO0043216 | 7/2000 |
| WO | WO0045344 | 8/2000 |
| WO | WO0078554 | 12/2000 |
| WO | WO01/00719 | 1/2001 |
| WO | WO0129764 | 4/2001 |
| WO | WO0145559 | 6/2001 |
| WO | WO01/56805 | 8/2001 |
| WO | WO01/95249 | 12/2001 |
| WO | WO0226507 | 4/2002 |
| WO | WO0227647 | 4/2002 |
| WO | WO0242371 | 5/2002 |
| WO | WO0245969 | 6/2002 |
| WO | WO02052499 | 7/2002 |
| WO | WO02053499 | 7/2002 |
| WO | WO02078965 | 10/2002 |
| WO | WO02096666 | 12/2002 |
| WO | WO03/005291 | 1/2003 |
| WO | WO03030079 | 4/2003 |
| WO | WO03055684 | 7/2003 |
| WO | WO03056500 | 7/2003 |
| WO | WO03056507 | 7/2003 |
| WO | WO03/095210 | 11/2003 |
| WO | WO03096258 | 11/2003 |
| WO | WO03095210 A3 | 4/2004 |
| WO | WO2004034236 | 4/2004 |
| WO | WO2004/049242 | 6/2004 |

OTHER PUBLICATIONS

Watt et al., "The Computer Image," Addison Wesley 1998, pp. 247-249.
@Fault: Improve Claims Practices Through Greater consistency in Fault Assessment, Computer Sciences corporation, pp. 2, 2004. (g53).
"@ Fault a Commitment to Consistency," Computer Sciences Corporation, Copyright 2000, pp. 1-2.
"About Card Printing How it Works", http://racoinindustries.com/aboutcardp5.htm, pp. 1-3 (Dec. 22, 2002).
"Accident Reconstruction Software Maine Computer Group," Maine Computer Group, Copyright 2001, updated 10101/2001, Accessed Oct. 29, 2001, pp. 1-2.
"ADP CSG: Integrated Medical Solutions," ADP Claims Solutions Group, Copyright 2001, Accessed Oct. 30, 2001, p. 1.
"Authentication and Security Technologies," 110 Software, Inc., Accessed Oct. 10, 2002, 4 pages.
"Biometric Access Control System, Face and Fingerprint Recognition," BioAxs 9800, not dated 4 pages.
"CSC Expands Cost Containment Solutions for Claims and Legal Expenses," Computer Sciences Corporation, Jun. 27, 2001, EI Segundo, CA, pp. 1-2.
"CSC Files Suit to protect Intellectual Property", PR Newswire, New York: Jan. 12, 2000, p. 1.
"CSC Introduces Liability Assessment Tool to Improve Claims Consistency," Computer Science Corporation, Oct. 31, 2001, pp. 1-2.
"CSC: Solutions Search," Computer Sciences Corporation, Copyright 2001, Accessed Oct. 30, 2001 p. 1.
"Facelt Identification SDK," Identix, Inc., Accessed 10107/2002, 2 pages.
"Facelt an Award-Winning Facial Recognition Software Engine," Visionics, not dated, 1 page.
"Facial Scan Technology: How it works," Facial-Scan, 1999, 4 pages.
"Facial Scan Vendors and Links," Facial-Scan, 1999, 3 pages.
"Frequently Asked Questions," Facelt software, Accessed Oct. 10, 2002, 13 pages.
"ID-2000-lmage Detection & Biometric Facial Recognition," 2000, 3 pages.
"Identification Solutions—Driver's Licenses and passports," Image Technologies, Copyright 2001-2002, Accessed Oct. 10, 2002, 1 page.
"IMS ICE," ADP Integrated Medical Solutions, Copyright 2001, Rockville, MD, pp. 1-6.
"Insurance Services Office Strengthens Claims Handling Team," ISO Properties, Inc., Copyright 1996, Accessed Jul. 13, 2009, Jersey City, NJ, pp. 1-3.
Introducing Smart CCTV: Facelt, Visionics, 2000, 8 pages.
"ISO Claims Outcome Advisor," ISO Properties, Inc., Copyright 1996, Accessed Oct. 30, 2001, Jersey City, NJ, pp. 1-2.
"ISO to Acquire Claims Outcome Advisor from Computer Sciences and MYND," Dec. 21, 2000, accessed at www.swam12fox.ws.
"Lenticular—How it WorKs", The Vision—Sales Articles from 1998.
"Lenticular Prints", htt12:11www.short!<Qurse§.com/howl-lenticularllentcular.htm, pp. 1-6 (12116/02).
"Multi-Modal Biometrics Authentication System," findbiometrics.com—Multimodal Biometrics Guides and Articles, 10109/03, 4 pages.
"Polaroid's Polaprime UV Invisible Ink System Winks at Hollywood as Godzilla's Eye in Promo Display", htt[1:IIwww.[lolaroid.com/[lolinfo/(;!ress releases/august98/080598a.html., pp. 1-2 (Nov. 26, 2002).
"Policy Management Systems Corporation Announces Pilot Licensing of Claims Outcome Advisor™ to Blue Ridge Insurance Co.," PR Newswire. New York; Aug. 24, 1999, p. 1.
REC-TEC Accident Reconstruction and Analysis Computer Software, George M. Bonnett, Nov. 2001, Rockledge, FL, pp. 1-5.
"REC•TEC Accident Reconstruction Software," George M. Bonnett, Sep. 2001, Rockledge FL, pp. 1-10.
"Secure ID Center: Design a Secure 10 card Key technologies for a secure 10", htt12:IIwww.datacard.com/secureid/secureid card technologies features.shtm., pp. 1-5 (12/12102).
"Technologies Overview", htt12:IIwww.nfive.com/Articles/2.htm, pp. 1-2 (12122102).
"U.S. Unveils New $20 Note With Background Colors", U.S. Bureau of Engraving and Printing New Money Media Center, 2 pages (07128/2003).
"We're Watching Out for You," Business Solution, Accessed 10/10102, 3 pages.
"Welcome to Orasee Corporation", htt(;!:IIwww.orasee.com/one/main.(;!h(;!3, pp. 1-2, (12113/02).
"What are 'Dye Sublimation Thenmal Printers'? (Technology)", htt(;!:/Iwww.nfive.com/Articles/2.htm., pp. 1-2 (12122/02).
Amended claims from W01056507, corresponding to those in EP 02 805 980.6, Apr. 24, 2008.
Appeal Brief filed Apr. 11, 2008 and Examiner's Answer dated May 7, 2008 from U.S. Appl. No. 10/893,149.

Aug. 16, 2007 communication from the Canadian Intellectual Property Office in Application No. 2,470,600, and a Feb. 15, 2008 Amendment in response thereto.
Baker, "Don't Throw Your Adjusters to the Lions", Best's Review, 95(12):66-69 (1995).
Banking Connections, Computer Sciences Corporation, Apr./May 1999, 44 pages.
Banking Connections, Computer Sciences Corporation, Apr./May 2000, 48 pages.
Banking Connections, Computer Sciences Corporation, AugusVSep. 1999, 52 pages.
Banking Connections, Computer Sciences Corporation, Dec. 1999, 48 pages.
Banking Connections, Computer Sciences Corporation, Nov./Dec. 2000, 48 pages.
Borland, "Running Microsoft Outlook 97", Microsoft Press, (1997).
Canadian Patent application 2,469,938, claims as filed, with effective filed of 12120/2002, 10 pages.
Canadian Patent application 2,469,938, Office Action dated Jul. 24, 2006, 2 pages.
Chow et al., "Forgery and Temper-Proof Identification Document," IEEE Proc. 1993 Int. Carnahan Conf. on Security Technology, Nov. 14, 1993.
CIGNA P&C Opens National Premises Liability Center, Mar. 1999, PR Newswire, p. 1.
Clariant Masterbatches Division Price Quotation #474938, Nov. 30, 2000, 2 pages.
Clariant Masterbatches, pricing, #762998, Jan. 9, 2004, 2 pages.
Connections to the Americas, vol. 3, No. 1, CSC Continuum, Jan. 1997, 55 pages.
Connections to the Americas, vol. 3, No. 2, CSC Continuum, Feb. 1997, 55 pages.
Connections to the Americas, vol. 3, No. 3, CSC Continuum, Mar. 1997, 48 pages.
Connections to the Americas, vol. 3, No. 4, CSC Continuum, Apr. 1997, 40 pages.
Connections to the Americas, vol. 3, No. 5, Computer Sciences Corporation, May/Jun. 1997, 66 pages.
Connections to the Americas, vol. 3, No. 6, Computer Sciences Corporation, Jul./Aug. 1997, 56 pages.
Connections to the Americas, vol. 3, No. 7, Computer Sciences Corporation, Sep./Oct. 1997, 76 pages.
Connections to the Americas, vol. 4, No. 1, Computer Sciences Corporation, Jan. 1998, 64 pages.
Connections to the Americas, vol. 4, No. 2, Computer Sciences Corporation, Feb./Mar. 1998, 50 pages.
Connections to the Americas, vol. 4, No. 3, Computer Sciences Corporation, May/Jun. 1998, 48 pages.
Connections to the Americas, vol. 4, No. 4, Computer Sciences Corporation, Sep./Oct. 1998, 62 pages.
Connections, Computer Sciences Corporation, Dec. 2001, 39 pages.
Connections, Computer Sciences Corporation, Jun. 2001, 44 pages.
Connections, Computer Sciences Corporation, Mar./Apr. 2001, 44 pages.
Connections, Computer Sciences Corporation, Oct. 2001, 39 pages.
Continuum Connections to the Americas, vol. 1, No. 1, The Continuum Company, Inc., Sep. 1995, 49 pages.
Continuum Connections to the Americas, vol. 2, No. 1, The Continuum Company, Inc., Jan. 1996,59 pages.
Continuum Connections to the Americas, vol. 2, No. 2, The Continuum Company, Inc., Mar. 1996, 59 pages.
Continuum Connections to the Americas, vol. 2, No. 3, The Continuum Company, Inc., May 1996, 51 pages.
Continuum Connections to the Americas, vol. 2, No. 4, The Continuum Company, Inc., Jul. 1996, 55 pages.
Continuum Connections to the Americas, vol. 2, No. 5, The Continuum Company, Inc., Sep. 1996, 59 pages.
Continuum Connections, vol. I, No. 1, The Continuum Company, Inc., Nov. 1991, 16 pages.
Continuum Connections, vol. I, No. 2, The Continuum Company, Inc., Jan./Feb. 1992, 17 pages.
Continuum Connections, vol. I, No. 3, The Continuum Company, Inc., Mar./Apr. 1992, 16 pages.
Continuum Connections, vol. I, No. 4, The Continuum Company, Inc., Jul./Aug. 1992, 15 pages.
Continuum Connections, vol. II, No. 1, The Continuum Company, Inc., Oct./Nov. 1992, 16 pages.
Continuum Connections, vol. II, No. 2, The Continuum Company, Inc., Dec./Jan. 1993, 24 pages.
Continuum Connections, vol. II, No. 3, The Continuum Company, Inc., Mar./Apr. 1993, 16 pages.
Continuum Connections, vol. II, No. 4, The Continuum Company, Inc., Jul./Aug. 1993,16 pages.
Continuum Connections, vol. II, No. 5, The Continuum Company, Inc., Nov./Dec. 1993,20 pages.
Continuum Connections, vol. II, No. 6, The Continuum Company, Inc., Jan./Feb. 1994, 19 pages.
Continuum Connections, vol. III, No. 1, The Continuum Company, Inc., Mar./Apr. 1994,24 pages.
Continuum Connections, vol. III, No. 2, The Continuum Company, Inc., Nov. 1Dec. 1994, 20 pages.
Continuum Connections, vol. III, No. 3, The Continuum Company, Inc., Mar./Apr. 1995, 16 pages.
Continuum Connections, vol. III, No. 4, The Continuum Company, Inc., Oct. 1, Nov. 1995,24 pages.
Cost Containment: Products and Solutions for the Property and Casualty Insurance Industry, Computer Science Corporation, Oct. 1999, 40 pages.
Datacard DCL30, "The Most Secure Card Personalization System for ID Programs," • 2002, 3 pages.
Davis, "Knowledge on the Beat," Jul. 1999, Knowledge Management Magazine, www.destinationkm.com.
Ditek@http://www.archive.org/web/20000301124742/www.ditec.com, last viewed on Nov. 28, 2005.
effekte, "Plastics on the Rise", Mar. 2001, 12 pages.
EM Industries Inc., Lazer Flair LS Series Pigments, Dec. 11, 2002, 3 pages.
EP 01992398.6 first examination report, dated Jan. 7, 2005.
EP 01992398.6 notice of grant, dated Nov. 28, 2005.
EP 01992398.6 response to first examination report, dated Jul. 18, 2005.
EP02797041.7 Search Report, Mar. 19, 2007, 3 pages.
EP02797041.7, communication pursuant to Article 94(3) EPC, dated Dec. 28, 2007, of related EP counterpart application, 6 pages.
Esters, "Computers Can Help Settle Auto Claims" Apr. 28, 1997, National Underwriter. vol. 101, Iss. 17, p. 10.
Examiner's Report dated May 2, 2006, from CA Application No. 2,470,600 (corresponding to PCT/US02/41681, Published as W003/056507).
Facelt, "Real Time Facial Surveillance and Identification System," Accessed Oct. 10, 2002, 5 pages.
Facelt-Hands off, continuous and in real-time, Visionics, not dated, 1 page.
Final Rejection, U.S. Appl. No. 10/836,639, Bi et al., filed Apr. 29, 2004, mailed Apr. 1, 2008.
Final Rejection, U.S. Appl. No. 10/836,639, Bi et al., filed Apr. 29, 2004, mailed Sep. 21, 2006.
Frey, Joe, "Putting a price on auto injuries: How software called Colossus evaluates your pain," Insure.com, Oct. 26, 2000, pp. 1-5.
Graff, "Laser Marking Makes Bigger Imprint in Plastics", Aug. 11, 2004, 7 pages.
Harts, "Reel to Real: Should You believe What You See?" Defense Counsel Journal, Oct. 1999, vol. 66. p. 514 from the Dialog File AB111nform Global.
Hill, "Cure of Thermoset Industrial Coatings", Proc. 2d Pacific Coatings forum, Nov. 1-3, 1997, 6 pages.
Hirabayashi et al., "AC Power Electroluminescence Maintenance Improvement", pp. 2449, 2452 (1983).
Holding State in Objects with Microsoft Transaction Server, Microsoft Corp., pp. 2, Jun. 1997. (f37).
Hong et al., Integrating Faces and Fingerprints for Personal Identification, IEEE Trans. on Pattern Analysis and Machine Intelligence, vol. 20, No. 12, Dec. 1998, pp. 1295-1307.
Howarth, B., "Outsourcing: Technology on tap", Information Economy, BRW, 21(47):1-5 (1998).

Hu et al., "Locating head and face boundaries for head-shoulder images", Patern Recognition, 32(8):1317-1333, (1999) 5230001 US.
Identix, Inc., ImageWare Brings Facial Recognition to the Web, press release, Accessed Oct. 10, 2002, 2 pages.
ImageWare Takes Enterprise 10 Management to the World Wide Web, new release, Accessed Oct. 10, 2002, 2 pages.
Indovina, "Multimodal Biometric Authentication Methods," A COTS Approach, 8 pages.
Insurance Connections, Computer Sciences Corporation, Feb./Mar. 1999, 52 pages.
Insurance Connections, Computer Sciences Corporation, Feb./Mar. 2000, 60 pages.
Insurance Connections, Computer Sciences Corporation, Jun./Jul. 1999, 56 pages.
Insurance Connections, Computer Sciences Corporation, Jun./Jul. 2000, 43 pages.
Insurance Connections, Computer Sciences Corporation, Sep./Oct. 2000, 43 pages.
Insurance Connections, Computer Sciences Corporations, Oct./Nov. 1999, 56 pages.
International search report application No. PCT/US01/30822, mailed Jan. 22, 2002, 5 pages.
Jain et al., A Multimodal Biometric System Using fingerprint, Face and Speech, Proc. 2d Int. Conf. on A VBPA, Mar. 1999, pp. 182-187.
Jarvis, "Are Privacy Rights of Citizens Being Eroded Wholesale?" Accessed 10104/2002, 5 pages.
Juhl, Randy P., "The OTC Revolution"; Drugtopics.com; Mar. 3, 1997, pp. 1-9.
Kahn, "The Premise Behind Premises Liability" Feb. 1994, Security Management, vol. 38, Iss.2 pp. 61-63.
Kanopoulos et al., "Design of an image edge detection filter using the sobel operator", IEEE J. Solid-State Circuits, 23(2):358-367 (1988).
Kawaguchi et al., "Principle and Applications of BPCS-Streganography," Proc. SPIE, 3258:464-473 (1998).
Komatsu et al., "Authentication System Using Concealed Image in Telematics," Memoirs of the School of Science & Engineering, Waseda Univ., No. 52, 45-60 (1988).
Komatsu, et al., "A Proposal on Digital Watermarking in Document Image Communication and Its Application to Realizing a Signature," Electronics and Communications in Japan, 73(5):22-23 (1990).
Laser Technology, Inc. "Crash/Crime Scene Mapping" @ http://www.lasertech.com/accidentcsinv.html. Copyright 1999.
Laser Technology, inc. "QuickMap 3D" http:web.archive.org1web/200003011511/222.1asertech.com/laserproducts/qm3d.html, last viewed on Nov. 28, 2005.
Lhotka et al., "Lenticular Inkjet Printmaking", http://www.dvpratt.com/evesmind/lentOver.htm, pp. 1-2 (12116/02).
Li et al., "Facial Expression Transformation Based on Sketch Image and Multiscale Edges", Electronics Comm. Japan, 84(9):67-75 (2001).
Lindberg, Gunnar, •Calculating Transport Accident Costs: Final report of the Expert Advisors to the high Level group on Infrastructure charging (Working Group 3). Borlaenge, Sweden. Apr. 27, 1999,53 pages.
Liu, "A Practical Guide to Biometric Security Technology," 2001 IEEE, Jan./Feb. 2001 IT PRO, pp. 27-32.
Madan, "The Face is Familier," 2001, 2 pages.
Malloy, "Big Time' Match Frame May Be Small, but it has No Problems Working with the Big Boys", San Antonio Business Journal, vol. 5 No. 11, sl, p. aa, Mar. 15, 1999. Dialog 10 No. 0205483 from Dialog File 635 (Business Dateline. RTM.).
McHenry, Brian G., "The Algorithms of Crash," Southeast Coast Collision Conference, Aug. 2001, pp. 1-34.
Mead, "Measuring the value added by technical documentation: A review of research and practice", Technical Communication, 45(3):353-380 (1998).
Meckbach, "U.S. Universities pick up Ditek's CAD application" Feb. 26, 1999. Computing Canada. vol. 25, Iss.8 p. 14.
Merlin, Jr., William F., Collision Course With the Colossus Program: How to Deal With It,• The Merlin Law Group, May 2000, Tampa, FL, pp. 1-17.
Merlin, Jr., William F., Colossus: What We Know Today, The Merlin Law Group, Aug. 2000, Tampa, FL, pp. 1-8.
Merlin, Jr., William F., Overcoming Allstate's TradeSecrets and Work-Product Objections,• The Merlin Law Group, Mar. 2000, Tampa, FL, pp. 1-31.
Mhatre, Efficient Search and Retrieval in Biometric Databases, not dated 4 pages.
Microsoft Component Services: Server Operating System a Technology Overview, Microsoft Corp., p. 1-7, Aug. 15, 1998. (f38).
Moran, R., "3-D Imagery", htt12:/Iwww.flexogra12hj!.org1flexo/article.cfm?ID=4::!, pp. 1-3 (12116/02).
Nandakumar, "Score Normalization in Multimodal Biometric Systems," not dated 2 pages.
Narin, Geoff, IT and Crime Resolution, It's elementary, Holmes helps UK police solve crimes, Financial Times, 1213/97, Financial Times (London, UK), p. 17.
Nicolle, "Elementary, dear Holmes," Jan. 22, 1997, The Times (London, UK, p. Interfa).
Non-Final Rejection, U.S. Appl. No. 10/836,639, Bi et al., filed Apr. 29, 2004, mailed Apr. 14, 2009.
Non-Final Rejection, U.S. Appl. No. 10/836,639, Bi et al., filed Apr. 29, 2004, mailed Aug. 8, 2007.
Non-Final Rejection, U.S. Appl. No. 10/836,639, Bi et al., filed Apr. 29, 2004, mailed Mar. 10, 2006.
Non-Final Rejection, U.S. Appl. No. 10/836,639, Bi et al., filed Apr. 29, 2004, mailed Aug. 10, 2005.
Oct. 18, 2007 Communication from the European Patent Office in Application No. EP 02 805980.6.
Office Action dated Feb. 1, 2007, from U.S. Appl. No. 10/942,321, 10 pages.
Office Action dated May 13, 2008, from U.S. Appl. No. 10/677,092, 5 pages.
Office Action dated Jun. 20, 2007, from U.S. Appl. No. 10/677,092, 6 pages.
Palla, "Classification and Indexing in Large Biometric Databases," 2 pages.
Paulson, B.A., "High Definition Printing Process for Identification Card Production", ICMA, www.icma.com/info/hd12rinting91099.htm, (Apr. 9, 2002).
PCT—International Search Report for International Application No. PCT/US02141644, mailed on May 30, 2003.
PCT—International Search Report for International Application No. PCT/US02141680, mailed on Jun. 5, 2003.
PCT—International Search Report for International Application No. PCT/US02141681, mailed on Jun. 5, 2003.
PCT—International Search Report for International Application No. PCT/US02140843, mailed on May 15, 2003.
PCT—International Search Report for International Application No. PCT/US03/15095, mailed on Mar. 25, 2004.
PCT—International Search Report for the International Application No. PCT/US02141320, mailed on Jul. 28, 2003.
PCT—Notification of Transmitial of the International Search Report or the Declaration, for International Application No. PCT/US02140843, mailed on May 15, 2003.
PCT—Notification of Transmitial of the International Search Report or TheDeclaration, for International Application No. PCT/US02141644, mailed on May 30, 2003.
PCT—Notification of Transmitial of the International Search Report or the Declaration, for International Application No. PCT/US02141680, mailed on Jun. 5, 2003.
PCT—Notification of Transmitial of the International Search Report or the Declaration, for International Application No. PCT/US02141681, mailed on Jun. 5, 2003.
PCT Notification of Transmitial of the International Search Report or Thedeclaration, for the International ~plication No. PCT/US02141320, mailed on Jul. 28, 2003.
Perry et al., Digital Watermarks as a Security Feature for Identity Documents•, Proc. of SPIE,vol. 3973, 80-87 (2000).
Plastics Technology, "Laser Marking Has a Bright Future in Plastics", htt12://www.121asticstechnologll.com/articies/2001 08fal.html, Aug. 1, 5 pages.
A PolyOne company web page for FAST MARK colorants, 2 printed pages, printed on Dec. 15, 2003 and accessed from: ht1Q://www.12ol11one.comlbizunitlbizunit info.as12?ID1={4D07B4ED-!;;098-43E4-B802-21413A 1 FA7 4C{&ID2={8C29FDCA-7C9E-433E-

897 A-DB6354A01 CAA1&ID3={00000000-0000-0000-0000-0000000QQ0001&ID4={FE3434DA-7FAQ-4FFF-99AF-CDDI19EC16AE11&bizUnit-NA-P-CM&line=&sub=none.

Property and Casualty Solutions: CSC's Property & Casualty Claims Solutions, Computer Sciences Corporation, pp. 2, 2003. (g51).

Ross, Information Fusion in Biometrics, •Proc. of 3m InU Cont. on Audio-and Video-Based Person Authentication, pp. 354-359, Jun. 6-8, 2001.

Ross, "Multimodal Biometrics: An Overview," 12 European Signal Processing Conf., pp. 1221-1224, Sep. 2004.

Santroprene, "Add Value to Your TPEs with Special Effects", not dated, 12 pages.

Scopus and Entrust: Call Center Sales Helper is Unveiled, Nov. 10, 1997; vol. 162, Issue 217, p. 19.

Scopus Introduces World's Most Complete Call Center Solution for Financial Services; PR Newswire dated Nov. 5, 1997.

Seybold Report on desktop Publishing, "Holographic Signatures for Digital Images", Aug. 1995, 1 page.

Spice, "Police use lasers, computers to map scenes Town of Pewaukee's new system boost accuracy of reconstructions, users say" Sep. 29, 1998. Milwaukee Journal Sentinel. p. 2.

Straight Through Processing: Migration Assessment for Series II Clients Computer Sciences Corporation, pp. 6, 2003. (gSO).

Supplemental European Search Report dated 7/20106, from EP Application No. 02805980 (Corresponding to PCT/US02141681; Published as W003/056507).

Szepanski, "A Signal Theoretic Method for Creating Forgery-Proof Documents for Automatic Verification", 1979 Carnahan Conference on Crime Countermeasures, University of Kentucky, Lexington, Kentucky, May 16-18, 1979, pp. 101-109.

Trademark for @Fault, accessed from uspto.gov on Feb. 8, 2006.

Traynor, "The Effects of Varying Safety Conditions on the External Costs of Driving," Winter, 1994 Eastern Economic Journal, vol. 20 No. 1 pp. 45-60.

U.S. Patent and Trademark Office, "Communication" for U.S. Appl. No. 09/969,027 mailed Jan. 11, 2008.

U.S. Patent and Trademark Office, "Communication" for U.S. Appl. No. 09/969,017 mailed May 9, 2007.

U.S. Patent and Trademark Office, "Communication" for U.S. Appl. No. 09/969,016 mailed May 3, 2007.

U.S. Patent and Trademark Office, "Communication" for U.S. Appl. No. 09/969,534 mailed May 30, 2007.

U.S. Patent and Trademark Office, "Communication" for U.S. Appl. No. 09/969,027 mailed Jun. 20, 2007.

U.S. Patent and Trademark Office, "Communication" for U.S. Appl. No. 10/306,866 mailed Jun. 21, 2007.

U.S. Patent and Trademark Office, "Communication" for U.S. Appl. No. 10/306,858 mailed Jun. 29, 2007.

U.S. Patent and Trademark Office, "Communication" for U.S. Appl. No. 09/969,021 mailed Mar. 8, 2007.

U.S. Patent and Trademark Office, "Communication" for U.S. Appl. No. 09/969,020 mailed Jul. 5, 2007.

U.S. Patent and Trademark Office, "Communication" for U.S. Appl. No. 09/969,018 mailed Jun. 21, 2007.

U.S. Patent and Trademark Office, "Communication" for U.S. Appl. No. 09/969,024 mailed May 23, 2007.

U.S. Patent and Trademark Office, "Communication" for U.S. Appl. No. 10/306,623 mailed Mar. 7, 2007.

U.S. Patent and Trademark Office, "Communication" for U.S. Appl. No. 10/306,873 mailed Sep. 20, 2007.

U.S. Patent and Trademark Office, "Communication" for U.S. Appl. No. 10/306,804 mailed Oct. 3, 2007.

U.S. Patent and Trademark Office, "Communication" for U.S. Appl. No. 10/306,909 mailed Oct. 5, 2007.

U.S. Patent and Trademark Office, "Communication" for U.S. Appl. No. 10/306,803 mailed Oct. 5, 2007.

U.S. Patent and Trademark Office, "Communication" for U.S. Appl. No. 10/306,908 mailed Oct. 4, 2007.

U.S. Patent and Trademark Office, "Communication" for U.S. Appl. No. 10/306,864 mailed Oct. 4, 2007.

U.S. Patent and Trademark Office, "Communication" for U.S. Appl. No. 09/969,545 mailed Oct. 18, 2006.

U.S. Patent and Trademark Office, "Communication" for U.S. Appl. No. 10/306,628 mailed Oct. 10, 2007.

U.S. Patent and Trademark Office, "Communication" for U.S. Appl. No. 09/969,024 mailed Jan. 31, 2006.

U.S. Patent and Trademark Office, "Communication" for U.S. Appl. No. 09/969,024 mailed Jun. 1, 2006.

U.S. Patent and Trademark Office, "Communication" for U.S. Appl. No. 09/969,022 mailed Apr. 6, 2006.

U.S. Patent and Trademark Office, "Communication" for U.S. Appl. No. 09/969,015 mailed Jun. 1, 2006.

U.S. Patent and Trademark Office, "Communication" for U.S. Appl. No. 09/969,019 mailed Jun. 1, 2006.

U.S. Patent and Trademark Office, "Communication" for U.S. Appl. No. 09/969,546 mailed Mar. 21, 2006.

U.S. Patent and Trademark Office, "Communication" for U.S. Appl. No. 09/969,016 mailed Mar. 21, 2006.

U.S. Patent and Trademark Office, "Communication" for U.S. Appl. No. 09/969,018 mailed Jan. 26, 2006.

U.S. Patent and Trademark Office, •Communication for U.S. Appl. No. 09/969,018 mailed Jun. 2, 2006.

U.S. Patent and Trademark Office, "Communication" for U.S. Appl. No. 09/969,545 mailed Mar. 23, 2006.

U.S. Patent and Trademark Office, "Communication" for U.S. Appl. No. 09/969,536 mailed Mar. 24, 2006.

U.S. Patent and Trademark Office, •Communication for U.S. Appl. No. 09/969,516 mailed Aug. 10, 2006.

U.S. Patent and Trademark Office, "Communication" for U.S. Appl. No. 09/970,161 mailed Mar. 23, 2006.

U.S. Patent and Trademark Office, "Communication" for U.S. Appl. No. 09/969,021 mailed Feb. 27, 2006.

U.S. Patent and Trademark Office, "Communication" for U.S. Appl. No. 09/969,146 mailed Feb. 28, 2006.

U.S. Patent and Trademark Office, "Communication" for U.S. Appl. No. 09/969,027 mailed Mar. 3, 2006.

U.S. Patent and Trademark Office, "Communication" for U.S. Appl. No. 09/969,018 mailed Dec. 4, 2006.

U.S. Patent and Trademark Office, "Communication" for U.S. Appl. No. 10/306,858 mailed Dec. 13, 2007.

U.S. Patent and Trademark Office, "Communication" for U.S. Appl. No. 10/238,981 mailed Jan. 25, 2008.

U.S. Patent and Trademark Office, "Communication" for U.S. Appl. No. 10/238,029 mailed Dec. 13, 2007.

U.S. Patent and Trademark Office, •Communication for U.S. Appl. No. 09/969,021 mailed Jan. 8, 2008.

U.S. Patent and Trademark Office, "Communication" for U.S. Appl. No. 10/238,981 mailed Apr. 16, 2008.

U.S. Patent and Trademark Office, "Communication" for U.S. Appl. No. 10/238,019 mailed Jan. 11, 2008.

U.S. Patent and Trademark Office, "Communication" for U.S. Appl. No. 10/306,623 mailed Jan. 25, 2008.

U.S. Patent and Trademark Office, "Communication" for U.S. Appl. No. 09/969,017 mailed Apr. 16, 2008.

U.S. Patent and Trademark Office, "Communication" for U.S. Appl. No. 09/969,016 Mar. 17, 2008.

U.S. Patent and Trademark Office, "Communication" for U.S. Appl. No. 09/969,534 mailed Apr. 15, 2008.

U.S. Patent and Trademark Office, "Communication" for U.S. Appl. No. 09/969,019 mailed Feb. 27, 2008.

U.S. Patent and Trademark Office, "Communication" for U.S. Appl. No. 09/969,019 mailed Apr. 28, 2008.

U.S. Patent and Trademark Office, "Communication" for U.S. Appl. No. 09/969,146 mailed Sep. 22, 2006.

U.S. Patent and Trademark Office, "Communication" for U.S. Appl. No. 09/969,146 mailed Oct. 5, 2007.

U.S. Patent and Trademark Office, "Communication" for U.S. Appl. No. 10/306,628 mailed Mar. 27, 2008.

U.S. Patent and Trademark Office, "Communication" for U.S. Appl. No. 10/238,029 mailed May 12, 2008.

U.S. Patent and Trademark Office, "Communication" for U.S. Appl. No. 10/306,864 mailed Mar. 27, 2008.

U.S. Patent and Trademark Office, "Communication" for U.S. Appl. No. 10/306,908 mailed Mar. 21, 2008.

U.S. Patent and Trademark Office, "Communication" for U.S. Appl. No. 10/306,866 mailed May 5, 2008.
U.S. Patent and Trademark Office, "Communication" for U.S. Appl. No. 09/969,534 mailed Feb. 17, 2006.
U.S. Patent and Trademark Office, "Communication" for U.S. Appl. No. 09/969,017 mailed Mar. 1, 2006.
U.S. Patent and Trademark Office, "Communication" for U.S. Appl. No. 09/969,017 mailed Oct. 11, 2006.
U.S. Patent and Trademark Office, "Communication" for U.S. Appl. No. 09/969,516 mailed Nov. 14, 2007.
U.S. Appl. No. 10/836,639, Bi et al., filed Apr. 29, 2004.
U.S. Appl. No. 09/741,779, filed Dec. 21, 2000.
U.S. Appl. No. 60/456,677, filed Mar. 21, 2003.
U.S. Appl. No. 60/459,284, filed Mar. 31, 2003.
U.S. Appl. No. 60/463,659, filed Apr. 16, 2003.
U.S. Appl. No. 60/463,660, filed Mar. 31, 2003.
U.S. Appl. No. 60/488,536, filed Jul. 17, 2003.
U.S. Appl. No. 60/494,660, filed Aug. 8, 2003.
Unisys Selects Identix for Department of Defense Research on Three Dimensional Facial Recognition, Press Release, Jul. 29, 2003, 3 pages.
Utzaeider, James, Microsoft Transaction Server and Internet Information Server: Technology for the Web,• Microsft Corp., p. 15, Feb. 6, 1998. (f44).
W. Rankl and W. Effing, "Smart Card Hand Book" 1997, John Wiley & Sons, pp. 35-40.
Warland et al., High-Performance Communication Networks, Economics, Chapter 8 through 8.2.1:361-369 (1996).
Watt & Policarpo, "The Computer Image", Addison Wesley, pp. 247-249 (1998).
Wayne Electronics, Inc., What is Facelt? Accessed Oct. 10, 2002, 5 pages.
Willems, "Biometrics: Detecting the 'Goats'," Speech Technology Magazine, Oct. 9, 2003,6 pages.
W0021052499 search report, dated Aug. 30, 2002.
W0021052499 Written Opinion, dated Mar. 18, 2004.

\* cited by examiner

*Primary Examiner* — Daniel Walsh

(74) *Attorney, Agent, or Firm* — Fish & Richardson P.C.

(57) ABSTRACT

The invention relates to identification documents, and in particular to pre-printing processing covert images, such as UV or IR images, provided on such identification documents. In one implementation, the invention provides a method of processing a digital image that is to be printed on a surface of an identification document as a fluorescing-capable image to improve the quality of the image. Edges or boundaries are detected within the image, the detected edges or boundaries forming an intermediate image. The edges or boundaries within the image are emphasized, and the emphasized image is used for printing the covert image. In some implementations of the invention, a digital watermark is embedded in the covert image.

12 Claims, 10 Drawing Sheets

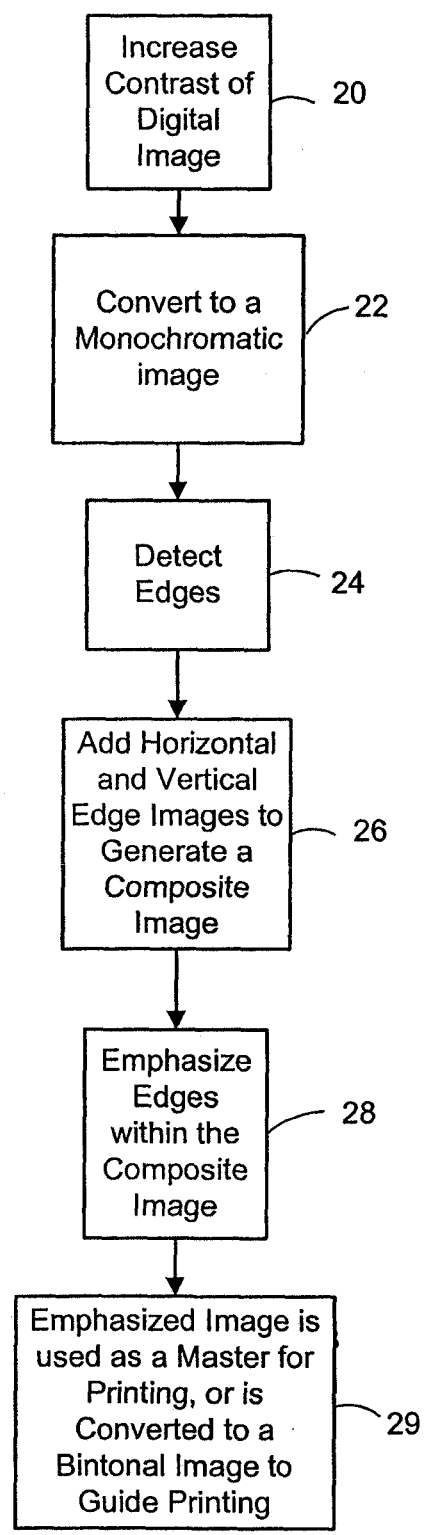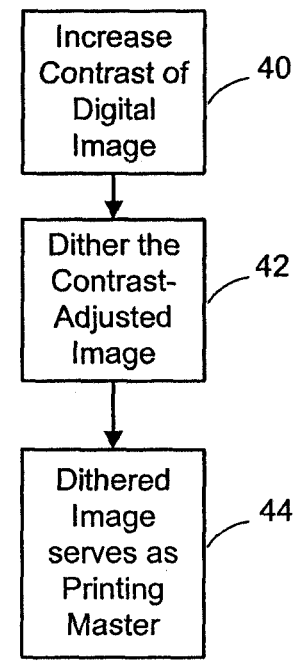

IMAGE PROCESSING TECHNIQUES FOR PRINTING IDENTIFICATION CARDS AND DOCUMENTS

RELATED APPLICATION DATA

This application is a continuation of U.S. Ser. No. 10/411,354, filed Apr. 9, 2003 now U.S. Pat. No. 7,815,124, which is a non-provisional of 60/371,335, filed Apr. 9, 2002, and a non-provisional of 60/429,115, filed Nov. 25, 2002. The contents of these applications are incorporated by reference herein in their entirety.

This application is also related to the following U.S. patent applications:
  Use of Pearlescent and Other Pigments to Create Security Documents (application Ser. No. 09/969,020, Inventors Bentley Bloomberg and Robert L. Jones, filed Oct. 2, 2001);
  Identification Card Printed With Jet Inks and Systems and Methods of Making Same (application Ser. No. 10/289,962, Inventors Robert Jones, Dennis Mailloux, and Daoshen Bi, filed Nov. 6, 2002);
  Contact Smart Cards Having a Document Core, Contactless Smart Cards Including Multi-Layered Structure, PET-Based Identification Document, and Methods of Making Same (application Ser. No. 10/329,318, filed Dec. 23, 2002—Inventors Robert Jones, Joseph Anderson, Daoshen Bi, Thomas Regan, and Dennis Mailloux,);
  Ink with Cohesive Failure and Identification Document Including Same (application Ser. No. 10/329,315, filed Dec. 23, 2002—Inventors Robert Jones and Bentley Bloomberg);
  Laser Engraving Methods and Compositions, and Articles Having Laser Engraving Thereon (application Ser. No. 10/326,886, filed Dec. 20, 2002—Inventors Brian Labrec and Robert Jones);
  Multiple Image Security Features for Identification Documents and Methods of Making Same (application Ser. No. 10/325,434, filed Dec. 18, 2002—Inventors Brian Labrec, Joseph Anderson, Robert Jones, and Danielle Batey);
  Covert Variable Information on Identification Documents and Methods of Marking Same (application Ser. No. 10/330,032, filed Dec. 24, 2002—Inventors: Robert Jones and Daoshen Bi);
  Systems, Compositions, and Methods for Full Color Laser Engraving of ID Documents (application Ser. No. 10/330,034, filed Dec. 24, 2002—Inventor Robert Jones); and
  Laser Etched Security Features for Identification Documents and Methods of Making Same (application Ser. No. 10,330,033, filed Dec. 24, 2002—Inventors George Theodossiou and Robert Jones).

The present invention is also related to the following provisional applications:
  Identification Document and Related methods (Application No. 60/421,254,—Inventors: Geoff Rhoads, et al);
  Identification Document and Related Methods (Application No. 60/418,762,—Inventors: Geoff Rhoads, et al);
  Shadow Reduction System and Related Techniques for Digital Image Capture (Application No. 60/410,544, filed Sep. 13, 2002—Inventors Scott D. Haigh and Tuan A. Hoang).
  Systems and Methods for Recognition of Individuals Using Combination of Biometric Techniques (Application No. 60/418,129, filed Oct. 11, 2002—Inventors James V. Howard and Francis Frazier);
  Systems and methods for Managing and Detecting Fraud in Image Databases used With Identification Documents (Application No. 60/429,501, filed Nov. 26, 2004—Inventors James V. Howard and Francis Frazier);
  Enhanced Shadow Reduction System and Related Technologies for Digital Image Captures (Application No, 60/447,502, filed Feb. 13, 2003—Inventors Scott D. Haigh, Tuan A. Hoang, Charles R. Duggan, David Bohaker, and Leo M. Kenen);
  Integrating and Enhancing Searching of Media Content and Biometric Databases (Application No. 60/451,840, filed Mar. 3, 2003); and
  Optically Variable Devices with Embedded Data for Authentication of Identity Documents (Application No. not yet assigned, filed Mar. 31, 2003—Inventor Robert Jones).

The present invention is also related to U.S. patent application Ser. No. 09/747,735, filed Dec. 22, 2000, and Ser. No. 09/602,313, filed Jun. 23, 2000, as well as U.S. Pat. No. 6,066,594.

Each of the above U.S. Patent documents is herein incorporated by reference in its entirety.

TECHNICAL FIELD

The present invention generally relates to identification and security documents, and in particular, relates to enhancing the formation a covert image such as a fluorescing, ultraviolet, infrared, thermachromic and/or optical variable image on such documents.

BACKGROUND AND SUMMARY

Identification Documents

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an JD document during check in, security screening and prior to boarding their flight. In addition, because we live in an ever-evolving cashless society, JD documents are used to make payments, access an automated teller machine (ATM), debit an account, or make a payment, etc.

(For the purposes of this disclosure, ID documents are broadly defined herein, and include, e.g., credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards or badges, etc., etc. Also, the terms "document," "card," "badge" and "documentation" are used interchangeably throughout this patent application.).

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image; the cards or documents may in addition carry other variant data (i.e., data specific to a particular card or document, for example an employee number) and invariant data (i.e., data common to a large number of cards, for example the name of an employer). All of the cards described above will hereinafter be generically referred to as "ID documents".

As those skilled in the art know, ID documents such as drivers licenses can contain information such as a photographic image, a bar code (which may contain information specific to the person whose image appears in the photographic image, and/or information that is the same from ID document to JD document), variable personal information, such as an address, signature, and/or birthdate, biometric information associated with the person whose image appears in the photographic image (e.g., a fingerprint), a magnetic stripe (which, for example, can be on the a side of the ID document that is opposite the side with the photographic image), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

An exemplary ID document can comprise a core layer (which can be pre-printed), such as a light-colored, opaque material (e.g., TESLIN (available from PPG Industries) or polyvinyl chloride (PVC) material). The core is laminated with a transparent material, such as clear PVC to form a so-called "card blank". Information, such as variable personal information (e.g., photographic information), is printed on the card blank using a method such as Dye Diffusion Thermal Transfer ("D2T2") printing (described further below and also described in commonly assigned U.S. Pat. No. 6,066, 594, which is incorporated herein by reference in its entirety.) The information can, for example, comprise an indicium or indicia, such as the invariant or nonvarying information common to a large number of identification documents, for example the name and logo of the organization issuing the documents. The information may be formed by any known process capable of forming the indicium on the specific core material used.

To protect the information that is printed, an additional layer of transparent overlaminate can be coupled to the card blank and printed information, as is known by those skilled in the art. Illustrative examples of usable materials for overlaminates include biaxially oriented polyester or other optically clear durable plastic film.

In the production of images useful in the field of identification documentation, it may be desirable to embody into a document (such as an ID card, drivers license, passport or the like) data or indicia representative of the document issuer (e.g., an official seal, or the name or mark of a company or educational institution) and data or indicia representative of the document bearer (e.g., a photographic likeness, name or address). Typically, a pattern, logo or other distinctive marking representative of the document issuer will serve as a means of verifying the authenticity, genuineness or valid issuance of the document. A photographic likeness or other data or indicia personal to the bearer will validate the right of access to certain facilities or the prior authorization to engage in commercial transactions and activities.

Identification documents, such as ID cards, having printed background security patterns, designs or logos and identification data personal to the card bearer have been known and are described, for example, in U.S. Pat. No. 3,758,970, issued Sep. 18, 1973 to M. Annenberg; in Great Britain Pat. No. 1,472,581, issued to G. A. O. Gesellschaft Fur Automation Und Organisation mbH, published Mar. 10, 1976; in International Patent Application PCT/GB82/00150, published Nov. 25, 1982 as Publication No. WO 82/04149; in U.S. Pat. No. 4,653,775, issued Mar. 31, 1987 to T. Raphael, et al.; in U.S. Pat. No. 4,738,949, issued Apr. 19, 1988 to G. S. Sethi, et al.; and in U.S. Pat. No. 5,261,987, issued Nov. 16, 1993 to J. W. Luening, et al. All of the aforementioned documents are hereby incorporated by reference.

Printing Information onto ID Documents

The advent of commercial apparatus (printers) for producing dye images by thermal transfer has made relatively commonplace the production of color prints from electronic data acquired by a video camera. In general, this is accomplished by the acquisition of digital image information (electronic signals) representative of the red, green and blue content of an original, using color filters or other known means. Devices such as digital cameras, optical sensors, and scanners also can provide digital image information. The digital image information is utilized to print an image onto a data carrier. For example, information can be printed using a printer having a plurality of small heating elements (e.g., pins) for imagewise heating of each of a series of donor sheets (respectively, carrying diffuseable cyan, magenta and yellow dye). The donor sheets are brought into contact with an image-receiving element (which can, for example, be a substrate) which has a layer for receiving the dyes transferred imagewise from the donor sheets. Thermal dye transfer methods as aforesaid are known and described, for example, in U.S. Pat. No. 4,621, 271, issued Nov. 4, 1986 to S. Brownstein and U.S. Pat. No. 5,024,989, issued Jun. 18, 1991 to Y. H. Chiang, et al. Each of these patents is hereby incorporated by reference.

Dye diffusion thermal transfer printing ("D2T2") and thermal transfer (also referred to as mass transfer printing) are two printing techniques that have been used to print information on identification cards. For example, D2T2 has been used to print images and pictures, and thermal transfer has been used to print text, bar codes, and single color graphics.

D2T2 is a thermal imaging technology that allows for the production of photographic quality images. In D2T2 printing, one or more thermally transferable dyes (e.g., cyan, yellow, and magenta) are transferred from a donor, such as a donor dye sheet or a set of panels (or ribbons) that are coated with a dye (e.g., cyan, magenta, yellow, black, etc.) to a receiver sheet (which could, for example, be part of an ID document) by the localized application of heat or pressure, via a stylus or thermal printhead at a discrete point. When the dyes are transferred to the receiver, the dyes diffuse into the sheet (or ID card substrate), where the dyes will chemically be bound to the substrate or, if provided, to a receptor coating. Typically, printing with successive color panels across the document creates an image in or on the document's surface. D2T2 can result in a very high printing quality, especially because the energy applied to the thermal printhead can vary to vary the dye density in the image pixels formed on the receiver, to produce a continuous tone image. D2T2 can have an increased cost as compared to other methods, however, because of the special dyes needed and the cost of D2T2 ribbons. Also, the quality of D2T2-printed image may depend at least on an ability of a mechanical printer system to accurately spatially register a printing sequence, e.g., yellow, magenta, cyan, and black.

Another thermal imaging technology is thermal or mass transfer printing. With mass transfer printing, a material to be deposited on a receiver (such as carbon black (referred to by the symbol "K")) is provided on a mass transfer donor medium. When localized heat is applied to the mass transfer donor medium, a portion (mass) of the material is physically transferred to the receiver, where it sits "on top of" the receiver. For example, mass transfer printing often is used to print text, bar codes, and monochrome images. Resin black mass transfer has been used to print grayscale pictures using a dithered gray scale, although the image can sometimes look coarser than an image produced using D2T2. However, mass transfer printing can sometimes be faster than D2T2, and faster printing can be desirable in some situations.

Printing of black ("K") can be accomplished using either D2T2 or mass transfer. For example, black monochrome "K" mass transfer ribbons include Kr (which designates a thermal transfer ribbon) and Kd (which designates dye diffusion).

Both D2T2 and thermal ink have been combined in a single ribbon, which is the well-known YMCK (Yellow-Magenta-Cyan-Black) ribbon (the letter "K" is used to designate the color black in the printing industry). Another panel containing a protectant ("P") or laminate (typically a clear panel) also can be added to the YMCK ribbon).

UV Security Features in ID Documents

One response to the problem of counterfeiting ID documents has involved the integration of verification features that are difficult to copy by hand or by machine, or which are manufactured using secure and/or difficult to obtain materials. One such verification feature is the use in the card of a signature of the card's issuer or bearer. Other verification features have involved, for example, the use of watermarks, biometric information, microprinting, covert materials or media (e.g., ultraviolet (UV) inks, infrared (IR) inks, fluorescent materials, phosphorescent materials), optically varying images, fine line details, validation patterns or marking, and polarizing stripes. These verification features are integrated into an identification card in various ways and they may be visible or invisible (covert) in the finished card. If invisible, they can be detected by viewing the feature under conditions which render it visible. At least some of the verification features discussed above have been employed to help prevent and/or discourage counterfeiting.

Covert security features are those features whose presence is not visible to the user without the use of special tools (e.g., UV or IR lights, digital watermark readers) or knowledge. In many instances, a covert security feature is normally invisible to a user. Some technologies that involve invisible features require the use of specialized equipment, such as a detector or a device capable of reading digital watermarks. One type of covert security feature is the printing of information (images, designs, logos, patterns, text, etc.) in a material that is not visible under normal lighting conditions, but can be viewed using a special non-visible light source, such as an ultraviolet (UV) or infrared (IR) light source. Use of UV and/or IR security features can be advantageous because although the devices (for example, UV and/or IR light sources) required to see and use such features are commonly available at a reasonable cost, the ability to manufacture and/or copy at least some implementations of such features is far less common and can be very costly. UV and IR based covert security features thus can help deter counterfeiters because the features cannot be copied by copiers or scanners and are extremely difficult to manufacture without the requisite know-how, equipment, and materials.

For example, the assignee of the present invention has developed and marketed a proprietary product called PolaPrime-UV™. PolaPrime-UV™ is a type of security feature. One application of PolaPrime-UV™ is for full color photo quality printing of fixed (i.e., not variable data) fluorescent images. The artwork that can be printed using PolaPrime-UV™ includes many images that can be produced with a combination of red, green, and blue phosphors. Under the appropriate light (e.g., a light source capable of providing UV light), the effect seen when viewing an image printed with PolaPrime-UV™ is similar in appearance to a television screen in that the image is formed by emission of light rather than reflection as with ink on paper. To date, PolaPrime-UV™ has been a reliable authenticator for genuine identification documents.

Printing of Covert Materials such as UV

Many images, such as color images, are formed by subtractive techniques, e.g., light is passed through absorbing dyes and the combination of dyes produce an image by sequentially subtracting cyan, magenta, and yellow components to provide the full color image. In the case of a UV fluorescing image, the UV image is formed by light emitting from fluorescing dyes or pigments as they are activated by a UV light or energy source. A UV image can be imparted to an ID document via methods such as thermal transfer or D2T2.

Regardless of whether the UV materials are imparted via D2T2 or mass transfer panel, both panels produce transmissive images—the mass transfer panel produces a bitonal (e.g., two tones) image and the dye sublimation panel produces a monochromatic (or shaded) image.

SUMMARY

For purposes of identification (e.g., of the bearer of an ID document or of the ID document itself), an ID document includes at least one image that is an "identification quality" likeness of the holder such that someone viewing the card can determine with reasonable confidence whether the holder of the card actually is the person whose image is on the card. "Identification quality" images, in at least one embodiment of the invention, include images that, when viewed using the proper facilitator (e.g., an appropriate light source for certain covert images, an appropriate temperature source for thermachromic images, etc.), provide a discernable image that is usable for identification or authentication purposes. To date, however, it has been very difficult to print images such as driver's license portraits with covert (i.e., not visible to an unaided human eye) materials/media such as UV, JR, thermachromic (materials whose appearance changes and/or becomes visible to a naked human eye with temperature), ferrofluids (materials whose appearance changes and/or becomes visible to a naked human eye upon application of a magnetic field) materials, where the quality of the covert image is sufficient to enable the image to be relied upon for identification or authentication. This can be especially difficult when attempting to print color images using covert materials.

Further, because of the enhanced security provided by the use of full color UV printing, such as is proposed in co-pending and commonly assigned U.S. patent application Ser. No. 10/330,032 (entitled "Covert Variable Information on Identification Documents and Methods of Making Same", the contents of which are incorporated herein by reference), it would be advantageous to be able to print variable or personal UV information at the time of card personalization, in one, two, or three UV colors, especially images that have a high enough quality to be used for authentication and/or identification. It also would be advantageous if the same information could be printed in a visible and invisible (e.g., UV) form at substantially the same time or at substantially the same printing step, where the covert image would be "identification quality".

In one embodiment of the invention, we provide methods by which one improves a digital image from which a covert image is formed. One aspect of our invention provides improvements to reduce a "washed-out" effect that can occur when a covert image that has been printed using a covert media such as UV ink, IR ink, thermachromic ink, inks comprising ferrofluids, and the like, is appropriately stimulated so as to cause the covert image to become visible. For example, such washed out effect can be seen when a UV or IR image fluoresces.

One problem that has prevented covert images such as UV or IR images from being "identification quality" is the problem of blurred image details. For example, a problem that can be associated with printing a UV covert image is that since the IN covert image 14 "glows" under appropriate UV stimulation, image details can be less apparent, blurred or can be completely lost. The UV glowing is capable of essentially "washing out" an image's perceptible crispness (e.g., similar to a situation in which a dimly lighted object is in proximity to a brightly lighted object). Similar problems can exist with IR glowing and with thermachromic inks. The inventors of the instant invention have found that image details can be enhanced to overcome this washout problem. In particular, in at least one embodiment of the invention, the inventors have found that it is possible to digitally process an image prior to printing to compensate for the glowing effect.

UV (and/or IR) image glow which washes out the details of a fluorescing UV (and/or IR) image can thus present a considerable problem in relying upon such covert images for identification. To create a discernable fluorescing image on an ID document (useful for identification and security checks), in accordance with one embodiment of the invention, the inventors have found that we can enhance the digital data that is used to create the UV image. Without the inventive enhancements described herein, for example if one simply prints the digital information as such from a digital camera or scanned image, etc., then one may get gets (when fluorescing) an image that may not as useful for security or identification purposes due to the washed out effect of the UV image. The details of our inventive techniques follow.

In a further embodiment of the invention, steganographic embedded code, such a digital watermark, can be provided in the covert image 14.

In one embodiment, the invention provides a method of processing a digital image that is to be printed on a surface of an identification document as covert image. At least one of edges and boundaries within the image is detected, the detected edges or boundaries forming an intermediate image. The edges or boundaries within the intermediate image are emphasized.

In one embodiment, the invention provides a method of providing a covert image to an identification document. Contrast is increased in at least a portion of the digital image. The contrast-increased portion of the digital image is dithered. The dithered image is transferred to the identification document.

In one embodiment, the invention provides and identification document comprising a core layer and a cover image printed to the core layer. The core layer comprises a core material capable of having printed thereon an image formed using a covert medium. The cover image is formed by providing a digital image that is to be used as a model to generate the covert image, increasing the contrast in the digital image, detecting edges or boundaries within the digital image, the detected edges or boundaries forming an intermediate image, emphasizing the edges or boundaries within the intermediate image, and printing the emphasized intermediate image in a covert medium on the core layer.

The foregoing and other features and advantages of the present invention will be even more readily apparent from the following Detailed Description, which proceeds with reference to the accompanying drawings and the claims.

BRIEF DESCRIPTION OF THE DRAWINGS

The advantages, features, and aspects of embodiments of the invention will be more fully understood in conjunction with the following detailed description and accompanying drawings, wherein:

FIG. 2 is a flow diagram outlining a first aspect of the invention;

FIG. 4 is a flow diagram outlining a third aspect of the invention;

(FIGS. 5*a*-5*e* are provided in color) and in particular:

FIG. 5*a* is a photographic color image including a headshot of a human subject;

FIG. 5*b* illustrates the image of FIG. 5*a* with its contrast improved;

FIG. 5*c* emphasizes the horizontal edges of the FIG. 5*b* image;

FIG. 5*d* emphasizes the vertical edges of the FIG. 5*b* image;

FIG. 5*e* illustrates a composite image of FIGS. 5*c* and 5*d*;

FIG. 5*f* illustrates a binaryized version of FIG. 5*e*; and

FIG. 5*g* illustrates an inverted version of FIG. 5*f*.

Of course, the drawings are not necessarily drawn to scale, with emphasis rather being placed upon illustrating the principles of the invention. In the drawings, like reference numbers indicate like elements or steps.

DETAILED DESCRIPTION

Terminology

Figure 1:
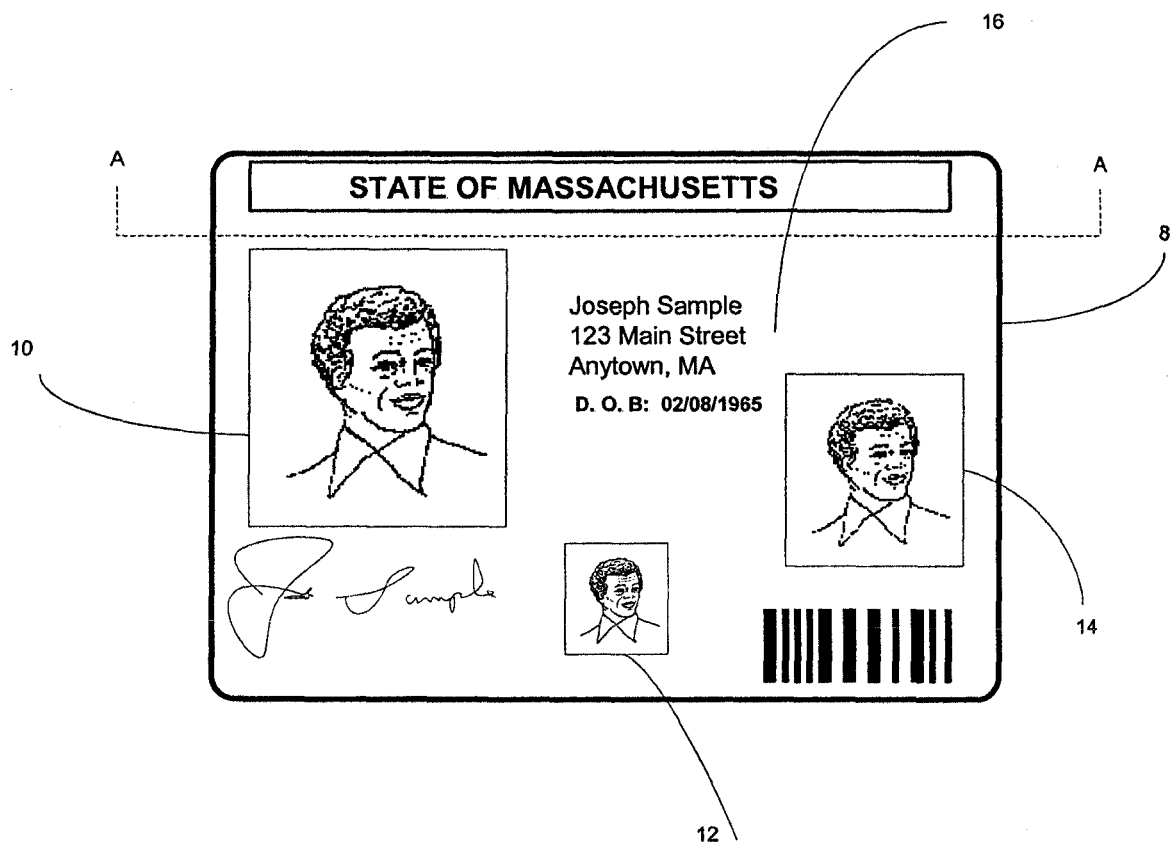
FIG. 1 is an illustration of an identification document in accordance with a first embodiment of the invention.

In the foregoing discussion, the use of the word "ID document" is broadly defined and intended to include all types of ID documents, including (but not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards, security badges, certificates, identification cards or documents, voter registration and/or identification cards, police ID cards, border crossing cards, security clearance badges and cards, legal instruments, gun permits, badges, gift certificates or cards, membership cards or badges, and tags. Also, the terms "document," "card," "badge" and "documentation" are used interchangeably throughout this patent application.). In at least some aspects of the invention, ID document can include any item of value (e.g., currency, bank notes, and checks) where authenticity of the item is important and/or where counterfeiting or fraud is an issue.

In addition, in the foregoing discussion, "identification" at least refers to the use of an ID document to provide identification and/or authentication of a user and/or the ID document itself. For example, in a conventional driver's license, one or more portrait images on the card are intended to show a likeness of the authorized holder of the card. For purposes of identification, at least one portrait on the card (regardless of whether or not the portrait is visible to a human eye without appropriate stimulation) preferably shows an "identification quality" likeness of the holder such that someone viewing the card can determine with reasonable confidence whether the holder of the card actually is the person whose image is on the card, "Identification quality" images, in at least one embodiment of the invention, include covert images that, when viewed using the proper facilitator (e.g., an appropriate light or temperature source), provide a discernable image that is usable for identification or authentication purposes.

There are a number of reasons why an image or information on an ID document might not qualify as an "identification quality" image. Images that are not "identification quality" may be too faint, blurry, coarse, small, etc., to be able to be discernable enough to serve an identification purpose. An image that might not be sufficient as an "identification quality" image, at least in some environments, could, for example, be an image that consists of a mere silhouette of a person, or an outline that does not reveal what might be considered essential identification essential (e.g. hair or eye color) of an individual.

Of course, it is appreciated that certain images may be considered to be "identification quality" if the images are machine readable or recognizable, even if such images do not appear to be "identification quality" to a human eye, whether or not the human eye is assisted by a particular piece of equipment, such as a special light source. For example, in at least one embodiment of the invention, an image or data on an ID document can be considered to be "identification quality" if it has embedded in it machine-readable information (such as digital watermarks or steganographic information) that also facilitate identification and/or authentication.

Further, in at least some embodiments, "identification" and "authentication" are intended to include (in addition to the conventional meanings of these words), functions such as recognition, information, decoration, and any other purpose for which an indicia can be placed upon an article in the article's raw, partially prepared, or final state. Also, instead of ID documents, the inventive techniques can be employed with product tags, product packaging, business cards, bags, charts, maps, labels, etc., etc., particularly those items including marking of an laminate or over-laminate structure. The term ID document thus is broadly defined herein to include these tags, labels, packaging, cards, etc.

"Personalization", "Personalized data" and "variable" data are used interchangeably herein, and refer at least to data, images, and information that are "personal to" or "specific to" a specific cardholder or group of cardholders. Personalized data can include data that is unique to a specific cardholder (such as biometric information, image information, serial numbers, Social Security Numbers, privileges a cardholder may have, etc.), but is not limited to unique data. Personalized data can include some data, such as birthdate, height, weight, eye color, address, etc., that are personal to a specific cardholder but not necessarily unique to that cardholder (for example, other cardholders might share the same personal data, such as birthdate). In at least some embodiments of the invention, personal/variable data can include some fixed data, as well. For example, in at least some embodiments, personalized data refers to any data that is not pre-printed onto an ID document in advance, so such personalized data can include both data that is cardholder-specific and data that is common to many cardholders. Variable data can, for example, be printed on an information-bearing layer of the ID card using thermal printing ribbons and thermal printheads.

Image Processing

In one embodiment of the invention, the inventors have found that different image processing techniques are used to preprocess an original image that is to be printed as a covert image (using, for example, a covert media) depending on whether the tonality of image reproduction (e.g., printing process) is bitonal (e.g., two tones such as black and white or a first color and second color) or monochromatic (e.g., shaded image, grayscale, etc.). The inventors also note that other optional factors to consider include the viewing methods used with the image, such as reflectance, transmissive characteristics (e.g., as discussed above with the UV glowing) and tactility.)

For the methods discussed below, assume that an image is in digital form, such as resulting from being digitally captured, e.g., via a digital camera, optical sensor, etc., or through scanning a photograph with a scanner, etc. In at least some embodiments of the invention, we provide methods to refine this captured image to produce an intermediate image, which can be transferred or printed (or used to generate an image to be transferred or printed) to the identification document as covert image 14.

Mass Transfer Images

In one embodiment, the invention provide a method that can be particularly well suited for producing bitonal images (e.g., black and white images), such as produced through mass-transfer thermal printing and Laser Xerography. Generally, in this embodiment, we process a captured image to bring-out or otherwise enhance relevant features found in the captured image. Relevant features of a human face may include the face outline, nose and mouth pattern, ear outline, eye shape, eye location hairline and shape, etc., or any other feature(s) that have been deemed to be relevant for identification purposes (e.g., particular features used with matching algorithms such as facial recognition algorithms). Once identified, these featured can be "thickened" or otherwise emphasized. The emphasized features can then form a digital version of a covert image, which can be transferred to an identification card.

The following discussion proceeds with reference to the accompanying flow diagrams and Figures and images (FIGS. 5a-5g) that variously correspond to our inventive processes.

FIG. 1 illustrates an identification document (ID) 8 in accordance with one embodiment of the invention, including an image 10 that is visible under normal viewing conditions. The ID document 8 can be formed using a core material such as PVC, ESLIN, polycarbonate (PC), Image 10 is preferably a color image, but the present invention is not limited to such. The document optionally includes ghost image 12, which can be a screened-back or "Ghost" version of image 10. Ghost image 12 is also preferably visible under normal viewing conditions. Covert image 14 (which is shown to be visible for illustrative purposes only) preferably corresponds to image 10 and is preferably an image that is not visible under "normal" viewing conditions.

We note that in an alternative embodiment, the identification document 8 need not include all three of the images 10, 12, and 14. For example, in one embodiment, the identification document 8 can only include covert image 14. In another embodiment, the identification document includes both covert image 14 and image 10. (Note that FIG. 1 is illustrated as if covert image 14 is undergoing appropriate stimulation of the covert image (or, if the covert image is an optically variable image, is being held at an angle if printed with optical variable ink), since covert image 14 is illustrated as being visibly perceptible. It should be also appreciated that the present invention encompasses identification documents including more or less features than the illustrated document in FIG. 1. Additional features may include bar codes, magnetic stripes, digital watermarks, signatures and biometric information (e.g., fingerprint, etc.). These features, along with the positioning or embedding of the features, are optional, and are not required to practice the present invention.).

In one embodiment of the invention, covert image 14 is an ultraviolet (UV) image, meaning that it glows (e.g., visibly fluoresces or emits radiation) in response to appropriate UV stimulation. (In some implementation, the UV fluoresces in the UV spectrum upon excitation with visible light.). Covert image 14 is generally imperceptible under normal (e.g., non-ultraviolet or non-angle) viewing conditions.

In one embodiment of the invention, covert image 14 is an infrared (IR) image, meaning that it glows (e.g., visibly fluoresces or emits radiation) in response to appropriate IR stimulation. In one embodiment of the invention, covert image 14 is a thermachromic image, meaning that it becomes visible only when the image (or entire ID document 8) is subject to a predetermined change in temperature, such as by heating or cooling. In one embodiment of the invention, covert image 14 is an optically variable image, meaning that covert image 14 is most visible when viewed at an angle. In one embodiment of the invention, covert image 14 is formed using a material such as a ferrofluid (available from FeroTec of Nashua, N.H.). Ferrofluids are responsive to magnetic fields, and we anticipate that ferrofluids can be used to produce covert images that become visible when an appropriate magnetic field is applied to the ferrofluid.

In one embodiment of the invention, covert image 14 is a combination of any one or more of UV, IR, thermachromic, ferrofluidic, and/or optically variable images. For example, covert image 14 can be both a UV and a thermachromic image by printing the card area, using the methods described herein, with both UV and thermachromic inks, meaning that when subject to appropriate stimulation, the normally "blank" area of the card will display either a UV image (if appropriate UV stimulation is provided) or a thermachromic image (if appropriate temperature is provided). Those skilled in the art will appreciate that many combinations are possible. It is even envisioned that combination type inks, such as UV thermachromic inks (meaning inks that, to display an image, require both UV and appropriate temperature), the methods described herein will be usable with such inks.

Figure 5A:
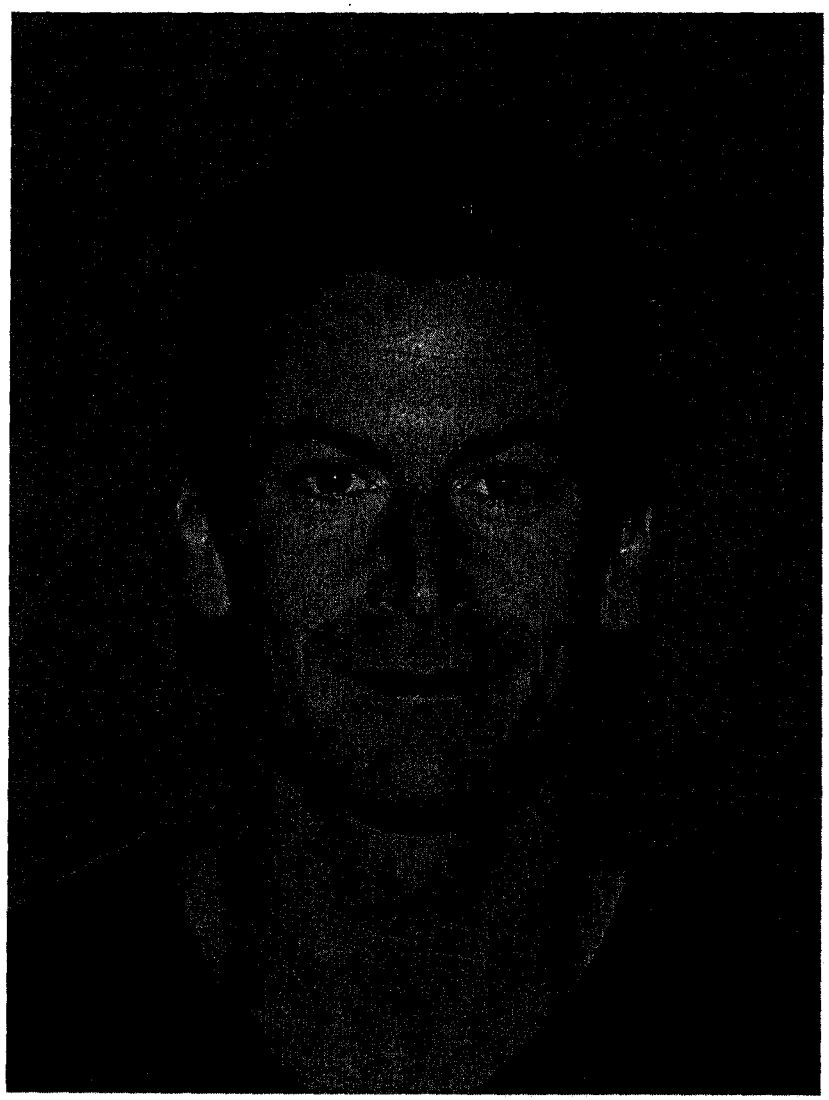
FIGS. 5*a*-5*g* are exemplary images illustrating an inventive aspect of the present invention)

FIG. 2 illustrates a first implementation of a method to emphasize particular image features, in accordance with one embodiment of the invention. As an initial step, we can improve the contrast in a captured image (step 20). For example, FIG. 5a illustrates such a captured image—a headshot corresponding to a human subject—while FIG. 5b corresponds to a contrast improved version of FIG. 5b, after the processing of step 20. For example, step 20 is intended to make dark pixels relatively darker and light pixels relatively lighter so as to increase the contrast of the image. Image processing methods to improve contrast are well known to those skilled in the art and not detailed here.

Figure 5B:
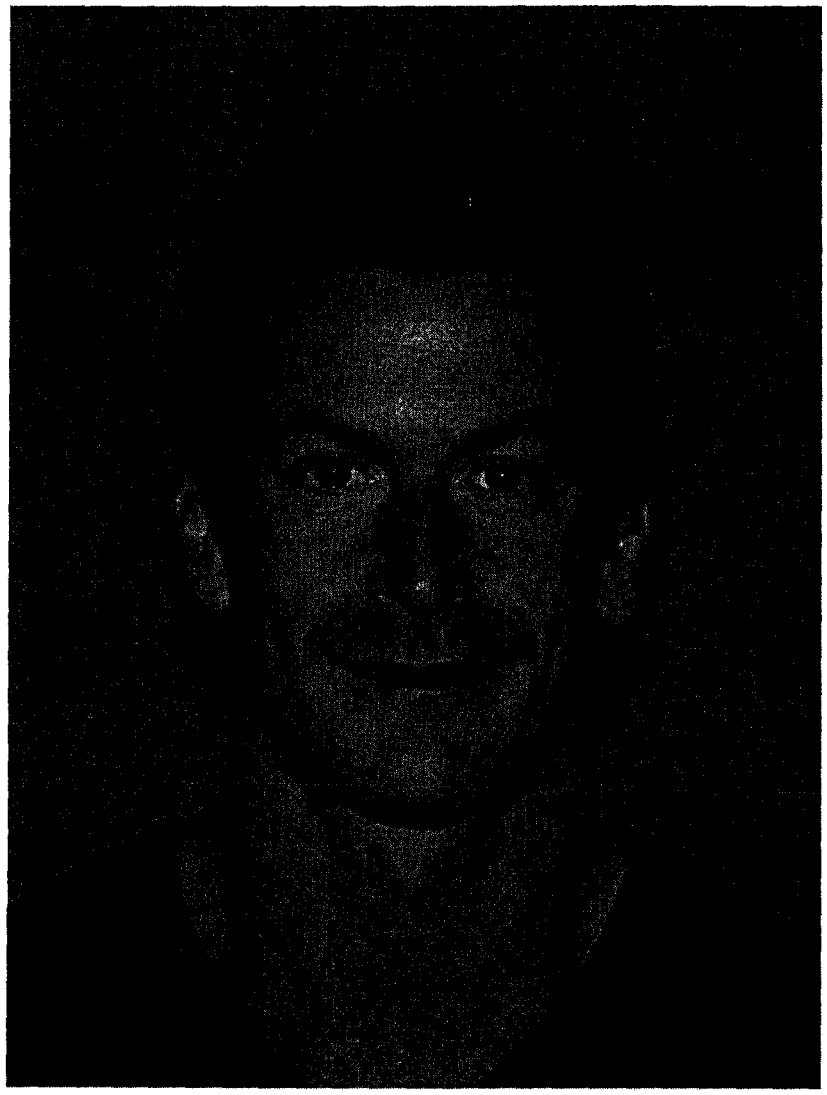
Figure 5C:
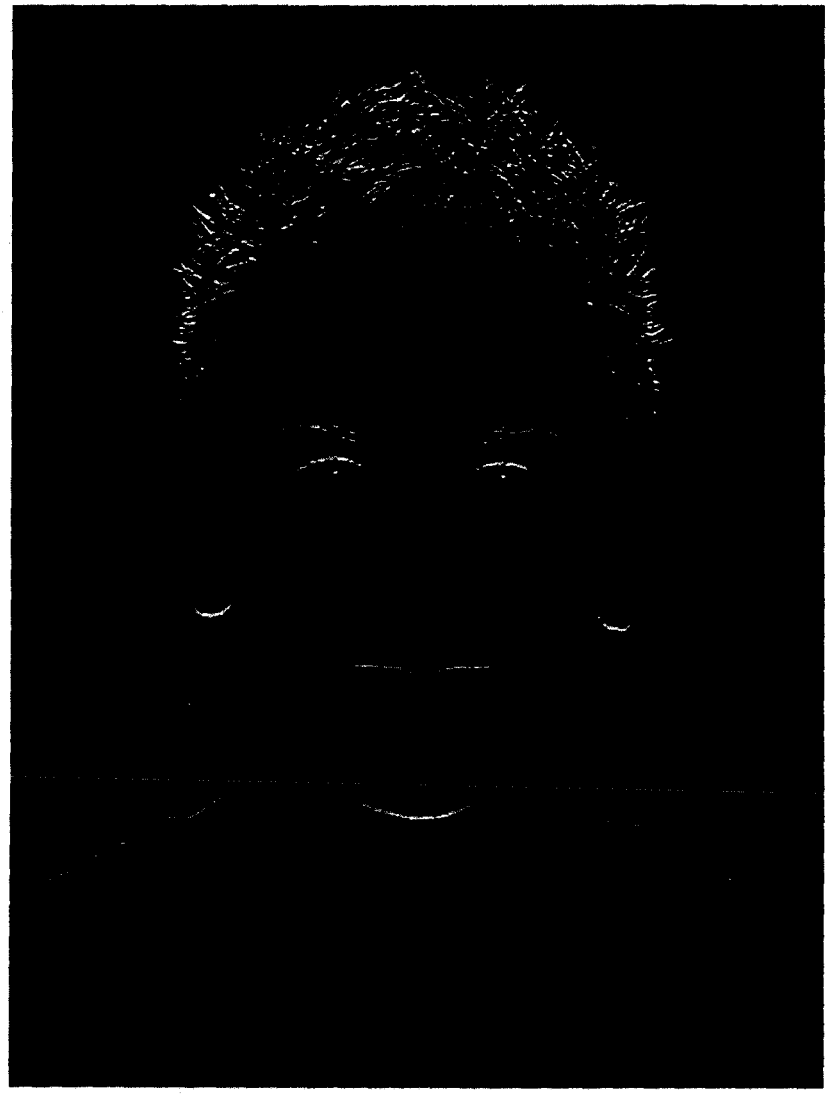
Figure 5D:
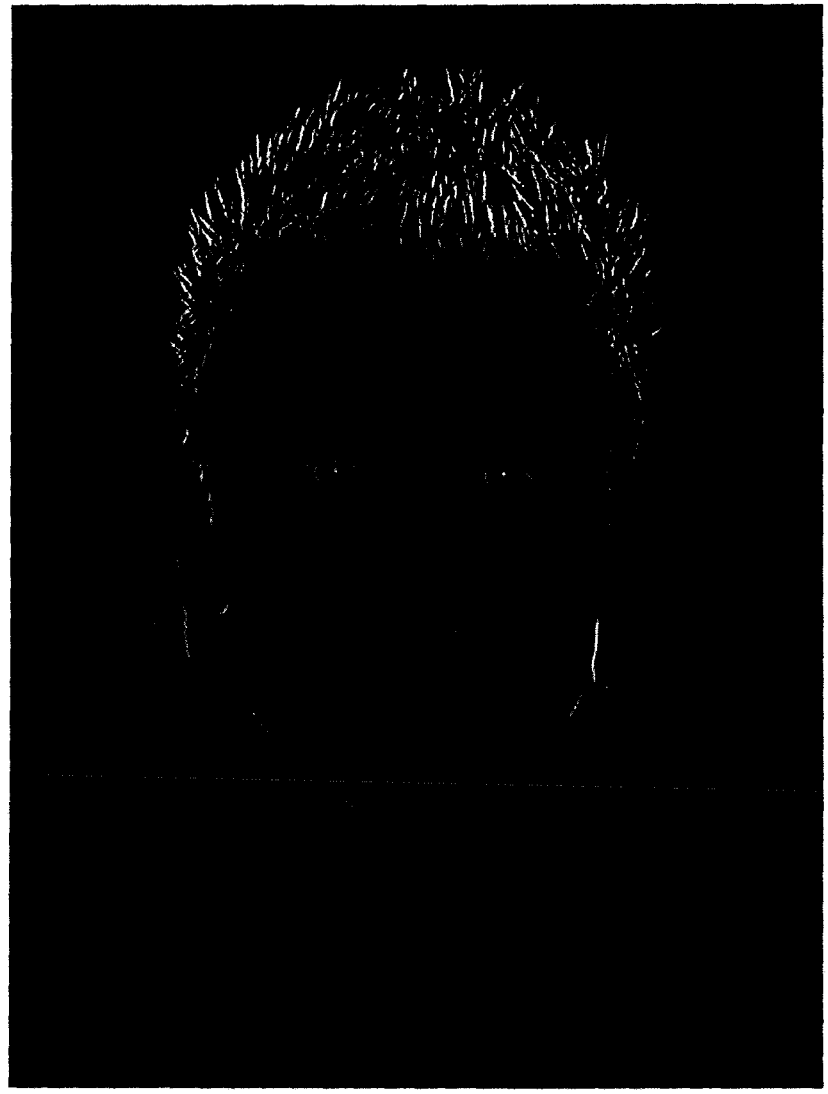

In addition, it should be noted that although FIGS. 5a and 5b are color images, the present invention is not limited to such. Indeed, our inventive techniques apply to black and white images as well. FIG. 5a preferably corresponds to image 10 (FIG. 1). Although not required, step 20 is capable of improving the performance of subsequent steps, such as the edge detection step 24. In some implementations of the invention, as a second step, the contrast-improved image (FIG. 5b) can be converted to a monochromatic image, e.g., a gray-scale image (step 22).

We analyze the contrast-enhanced image to identify or detect edges and/or boundaries within the image in step 24. As noted, eyes, nose and mouth often include prominent edges. Our preferred edge detection algorithm is the Sobel algorithm, however, we note that many other conventional algorithms such as other gradient-based edge detection algorithms (e.g., Roberts, Prewitt), Laplacian (e.g., Morrs-Hildreth) and the Canny edge algorithm can be suitably interchanged with this aspect of the present invention, as will be appreciated by those skilled in the art. Such algorithms are described, for example, in Alan Watt and Fabio Policarpo, *The Computer Image*, (Addison Wesley 1998) at p. 247-249, and also in many U.S. patent documents, such as U.S. Pat. Nos. 6,526,161 and 4,443,438 which are incorporated herein by reference. The results of an edge detector produce an outline-like image, which highlights the edges (or maybe just the significant edges) of the monochromatic image. If using a Sobel algorithm, or another algorithm that produces multiple planes, a horizontal edge plane (FIG. 5c) and a vertical edge plane (FIG. 5d) are produced. These horizontal and vertical planes (or sub-images) can be combined to produce a composite image as in step 26. Of course, step 26 can be skipped if the edge detection algorithm used in step 24 provides a composite horizontal and vertical edge image, instead of separate horizontal and vertical sub-images.

Figure 5E:
Figure 5F:
Figure 5G:
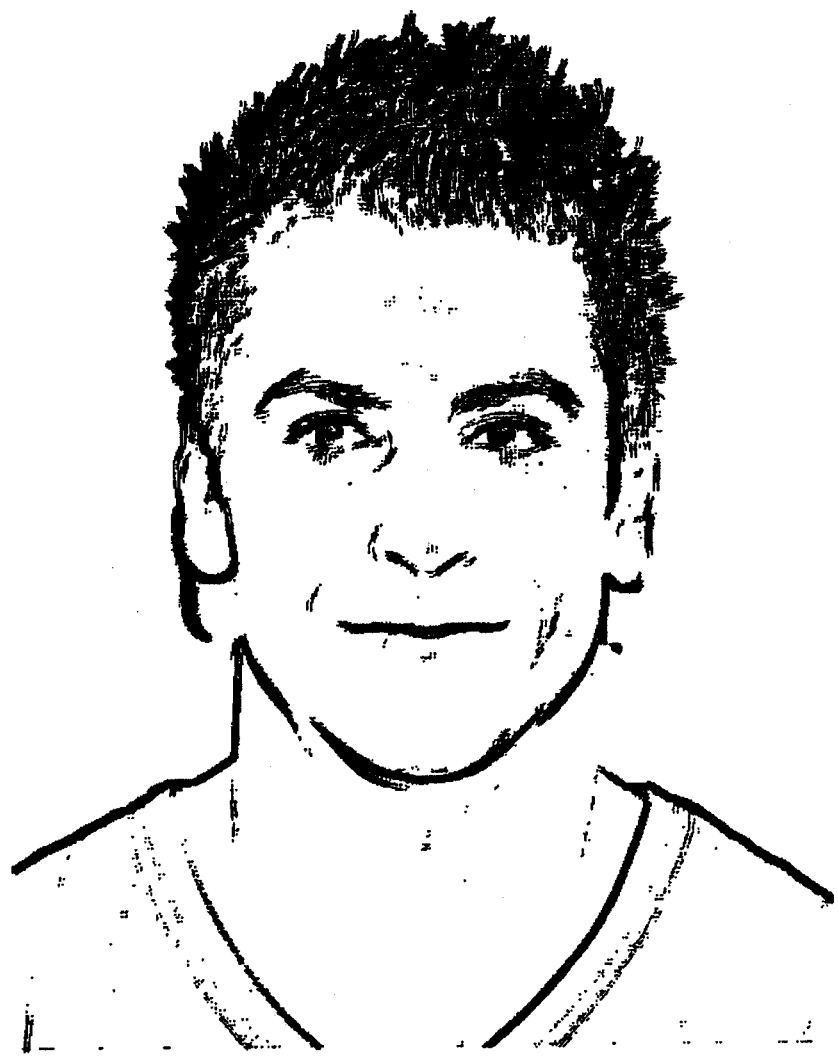

The composite image is then smeared, thickened or otherwise emphasized in step 28 (FIG. 5e). For example, in one embodiment, we can "grow" the edges by a predetermined factor (e.g., 1½-2 times the original edge or line thickness). In one embodiment, we can use an iterative pasting of each sub-image or image plane, multiple times onto a final composite image, but each time offsetting the sub-image by a few pixels (e.g., in a range of 2-5 pixels). In one embodiment, once a composite image is formed, the composite image can be repeatedly copied onto itself, but offset in different directions (toward image corners, or along an X-Y axis, etc.).

In one embodiment of the invention, this thickened image (FIG. 5e) serves as the master (or negative) for guiding printing of UV covert image 14. In one embodiment of the invention, the thickened image is binaryized or converted to a bitonal image (FIG. 5O to guide the printing of covert image 14 (step 29). In one embodiment of the invention, the thickened image or bitonal image is first inverted (FIG. 5g), and the inverted image guides the printing of covert image 14. (So, FIG. 5G could be printed as the covert image 14.).

We have found that the method of FIG. 2 can be capable of significantly reducing the washing-out of image details experienced in conventional covert images such as UV, IR, or thermachromic images (when fluorescing or otherwise being stimulated).

Figure 3:
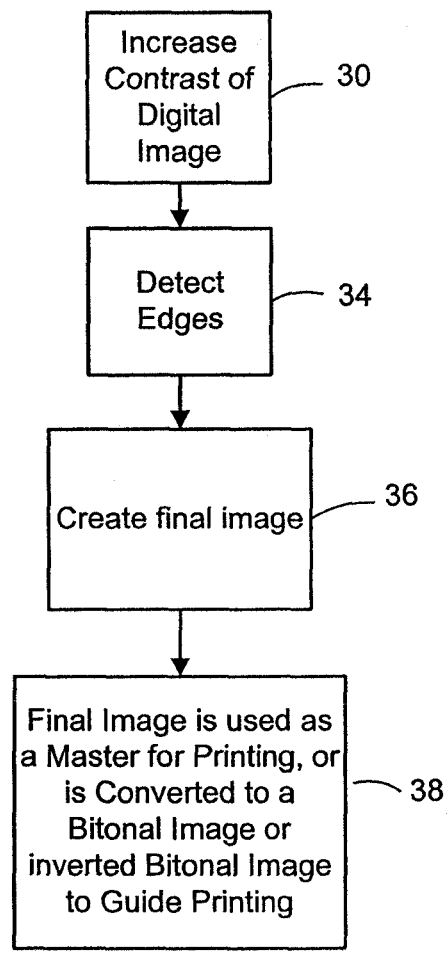
FIG. 3 is a flow diagram outlining a second aspect of the invention.

An alternative implementation of the invention is discussed with reference to FIG. 3. We improve the contrast in a captured image (step 30). Here again, FIG. 5a illustrates such a captured image—a headshot corresponding to a human subject—while FIG. 5b corresponds to a contrast improved version of FIG. 5b. As previously noted, step 30 emphasizes the contrast of an image, e.g., by making dark pixels relatively darker and light pixels relatively lighter (step 30 of FIG. 3 is similar to step 20 of FIG. 2). Our contrast-enhancing step 30 is capable of improving the performance of subsequent steps in FIG. 3, such as the edge detection step 34.

Referring again to FIG. 3, in step 34, we analyze the contrast-enhanced image to identify or detect edges and/or boundaries within the image (step 34 of FIG. 3 is substantially similar to step 24 of FIG. 2). Virtually any edge detection algorithm is usable for step 34. As noted, facial features such as eyes, nose, hair details and mouth often include prominent edges. The results of an edge detector produce an outline-like image, which highlights the edges (or in some implementations just significant edges) of the contrast-enhanced image.

If using a Sobel algorithm, or another algorithm that produces multiple planes, a horizontal edge plane (FIG. 5c) and a vertical edge plane (FIG. 5d) are produced. The results of the edge detection are provided to form a composite image (e.g., step 36; FIG. 5e).

The composite image of step 36 is used to guide printing (step 38). In some implementations we convert the composite image into a binaryized or bitonal image (e.g., FIG. 5f). We can also invert a binaryized or bitonal image (e.g., resulting in FIG. 5g) to guide printing. We have found that the method of FIG. 3 method is also capable of reducing the washing-out of image details experienced in conventional covert images (e.g., UV, IR, thermachromic) images when the images are appropriately stimulated to become visible (e.g., when fluorescing for UV images).

Monochromatic

With reference to FIG. 4, a method for enhancing UV images formed through, e.g., D2T2, is described. An originally captured image is processed to increase the contrast in the captured image or in selected areas of the original image (step 40). (In one embodiment, the invention uses an edge-detection algorithm to identify selected areas (e.g., eyes, nose, mouth, face shape, etc.) in the original image, and the contrast in only these selected areas is increased.). We note that care should be taken when using image-adaptive software to avoid removing pixel-intensity information that contributes to the quality of a final image. Dithering (e.g., the Floyd Stein dithering method or other conventional dithering methods (e.g., Floyd Stein, Burkes, Ordered dithering, Stucki, Stephens, Sierra and Jarvis, as are known to those skilled in the art)) of the contrast-adjusted image is employed (step 42) to produce a print-ready image usable as a printing master (step 44). The dithering helps to minimize the effects of UV washout. The dithered image is used as a master for printing a corresponding UV image (step 44). In one embodiment, we invert the dithered image, and then guide printing with the dithered image. As an optional step (not shown in FIG. 4), we scale the contrast-adjusted image to a size that it will be printed, prior to step 42. Those skilled in the art will appreciate that many conventional algorithms and products are usable to scale the contrast-adjusted image to a desired size.

In one embodiment of the invention, we embed a steganographic code into the covert image 14. For example, steganographic code can be embedded into a covert UV image 14. The code can be embedded in the master image, e.g., image 5g. Or the code can be embedded in perceptually significant features, e.g., facial outlines, hair, etc. that are able to survive the processing of FIGS. 2 and 3.

One form of steganographic encoding is digital watermarking. Digital watermarking is a process for modifying physical or electronic media to embed a machine-readable code into the media. The media may be modified such that the embedded code is imperceptible or nearly imperceptible to the user, yet may be detected through an automated detection process. In some embodiments, the identification document includes two or more digital watermarks.

Digital watermarking systems typically have two primary components: an encoder that embeds the digital watermark in a host media signal, and a decoder that detects and reads the embedded digital watermark from a signal suspected of containing a digital watermark (a suspect signal). The encoder embeds a digital watermark by altering the host media signal. The reading component analyzes a suspect signal to detect whether a digital watermark is present. In applications where the digital watermark encodes information, the reader extracts this information from the detected digital watermark.

The reading component can be hosted on a wide variety of tethered or wireless reader devices, from conventional PC-connected cameras and computers to fully mobile readers with built-in displays. By imaging a watermarked surface of the card, the watermark's "payload" can be read and decoded by this reader.

Several particular digital watermarking techniques have been developed. The reader is presumed to be familiar with the literature in this field. Some techniques for embedding and detecting imperceptible watermarks in media signals are detailed in the assignee's co-pending U.S. patent application Ser. No. 09/503,881, U.S. Pat. No. 6,122,403 and PCT patent application PCT/US02/20832, which are each herein incorporated by reference.

Returning to the present implementation, in accordance with this embodiment of the invention, a digital watermark is embedded in the covert image 14. For purposes of illustration, assume that the covert image 14 is a UV image printed in accordance with any of the methods of FIGS. 2 through 4 herein. A watermark detector can only read the covert UV watermark if the host identification document 8 is subject to appropriate UV stimulation at the same time that the host identification document is presented to the watermark detector. This provided additional security to the identification document 8, because even if a counterfeiter is able to access UV inks to print a bogus covert image 14, the bogus covert image 14 will not contain the embedded digital watermark. Of course, mere photocopying or scanning of the identification document 8 will similarly frustrate the counterfeiter, who will be unable to reproduce, through scanning or photocopying, either the covert image 14 or the watermark contained therein.

In one embodiment, the watermark embedded in the covert image 14 may include a payload or message. The message may correspond, e.g., to the ID document number, printed information, issuing authority, biometric information of the bearer, and/or database record, etc. The watermark embedded in the covert image 14 may also include an orientation component, to help resolve image distortion such as rotation, scaling and translation. In at least one embodiment of the invention, we embed two or more watermarks in the OVD image.

In further embodiments, the watermark embedded in the covert image 14 corresponds to information printed on the ID document, or to information carried by a second watermark embedded elsewhere on the ID document (e.g., background pattern, image 10, etc.). More techniques for digital watermarks and BD cards can be found in Digimarc's U.S. Provisional Patent application No. 60/421,254, U.S. patent application Ser. No. 10/094,593, and in U.S. Pat. No. 5,841,886. Each of these patent documents is incorporated herein by reference. We expressly contemplate that the techniques disclosed in this application can be combined with the aspects of the present invention.

Concluding Remarks

Having described and illustrated the principles of the technology with reference to specific implementations, it will be recognized that the technology can be implemented in many other, different, forms, and in many different environments.

The technology disclosed herein can be used in combination with other technologies. Also, instead of ID documents, the inventive techniques can be employed with product tags, product packaging, labels, business cards, bags, charts, smart cards, maps, labels, etc., etc. The term ID document is broadly defined herein to include these tags, maps, labels, packaging, cards, etc.

It should be appreciated that while FIG. 1 illustrates a particular species of ID document—a driver's license—the present invention is not so limited. Indeed our inventive methods and techniques apply generally to all identification documents defined above. Moreover, our techniques are applicable to non-ID documents, e.g., such as printing or forming covert images on physical objects, holograms, etc., etc. Further, instead of ID documents, the inventive techniques can be employed with product tags, product packaging, business cards, bags, charts, maps, labels, etc., etc., particularly those items including providing a non-visible indicia, such as an image information on an over-laminate structure. The term ID document is broadly defined herein to include these tags, labels, packaging, cards, etc. In addition, while some of the examples above are disclosed with specific core components, it is noted that-laminates can be sensitized for use with other core components. For example, it is contemplated that aspects of the invention may have applicability for articles and devices such as compact disks, consumer products, knobs, keyboards, electronic components, decorative or ornamental articles, promotional items, currency, bank notes, checks, etc., or any other suitable items or articles that may record information, images, and/or other data, which may be associated with a function and/or an object or other entity to be identified.

It should be understood that while our some of our detailed embodiments described herein use UV inks and/or dyes by way of example, the present invention is not so limited. Our inventive techniques and methods will improve the visibility and crispness of infrared and other fluorescing images as well. The inventive techniques and methods can improve the visibility and crispness of thermachromic inks and resins (i.e., inks and resins whose appearance changes and/or becomes visible with temperature changes). Moreover, our inventive techniques are useful for preprocessing images destined for ID documents using various printing processes including, but not limited to, dye infusion, mass-transfer, laser xerography, ink jet, wax transfer, variable dot transfer, and other printing methods by which a fluorescing image can be formed.

It should be appreciated that the methods described above with respect to FIGS. 1-5, as well as the methods for implementing and embedding digital watermarks, can be carried out on a general-purpose computer. These methods can, of course, be implemented using software, hardware, or a combination of hardware and software. We note that some image-handling software, such as Adobe's PrintShop, as well as image-adaptive software such as LEADTOOLS (which provide a library of image-processing functions and which is available from LEAD Technologies, Inc., of Charlotte, N.C.) can be used to facilitate these methods, including steps such as providing enhanced contrast, converting from a color image to a monochromatic image, thickening of an edge, dithering, registration, etc. An edge-detection algorithm may also be incorporated with, or used in concert with, such software. Computer executable software embodying the FIGS. 2-4 steps, or a subset of the steps, can be stored on a computer readable media, such as a diskette, removable media, DVD, CD, hard drive, electronic memory circuit, etc.).

To provide a comprehensive disclosure without unduly lengthening the specification, applicants hereby incorporate by reference each of the U.S. patent documents referenced above.

The technology and solutions disclosed herein have made use of elements and techniques known from the cited documents. Other elements and techniques from the cited documents can similarly be combined to yield further implementations within the scope of the present invention. Thus, for example, single-bit watermarking can be substituted for multi-bit watermarking, technology described as using imperceptible watermarks or encoding can alternatively be practiced using visible watermarks (glyphs, etc.) or other encoding, local scaling of watermark energy can be provided to enhance watermark signal-to-noise ratio without increasing human perceptibility, various filtering operations can be employed to serve the functions explained in the prior art, watermarks can include subliminal graticules to aid in image re-registration, encoding may proceed at the granularity of a single pixel (or DCT coefficient), or may similarly treat adjoining groups of pixels (or DCT coefficients), the encoding can be optimized to withstand expected forms of content corruption, etc. Thus, the exemplary embodiments are only selected samples of the solutions available by combining the teachings referenced above.

The other solutions necessarily are not exhaustively described herein, but are fairly within the understanding of an artisan given the foregoing disclosure and familiarity with the cited art. The particular combinations of elements and features in the above-detailed embodiments are exemplary only; the interchanging and substitution of these teachings with other teachings in this and the incorporated-by-reference patent documents are also expressly contemplated.

What is claimed is:

1. A system to reduce at least one of image washout and blurring caused by the fluorescence of a covert image that is to be transferred to an identification document for printing, the system comprising:

a computer system that runs executable software, wherein the executable software, when executed by a processor of the computer system, runs one or more edge detection algorithms;

at least one digital image to be processed by the computer system that runs the executable software, the digital image being stored in association with the computer system and comprising image pixels of varying degrees of dark and light;

the computer system accessing and retrieving the digital image that is to be used as a model to generate a covert image that is to be printed using the computer system on the identification document using a fluorescing medium;

the executable software, when executed by the processor of the computer system:

increasing contrast in the digital image, wherein the contrast includes making dark pixels relatively darker and light pixels relatively lighter;

identifying one or more contours of the image pixels of the digital image in which luminosity of the increased-contrast digital image changes more sharply than at adjoining regions in the image using the computer system;

generating a horizontal edge image comprising horizontal edge components, generating a vertical edge image comprising vertical edge components, and summing the vertical and horizontal edge images to form a composite image; and emphasizing the one or more contours by iteratively adding copies of the composite image onto itself to yield a final composite image, wherein each added copy is offset with respect to the previous copy;

the computer system forming a master image based on the final composite image; and the computer system using the master image to print the covert image.

2. The system of claim 1, wherein the offset comprises a range of 2-5 pixels.

3. The system of claim 1, wherein emphasizing the one or more contours comprises growing at least one of the one or more contours by a predetermined thickness.

4. The system of claim 1, further comprising the executable software, when executed by the processor of the computer system, converting the one or more emphasized contours to a bitonal image comprising pixels, wherein each pixel is assigned either a first or second value, but no other value, and inverting the bitonal image.

5. The system of claim 4, further comprising the computer system acting to cause printing of the inverted bitonal image on the identification document with at least one covert medium.

6. The system of claim 1, wherein the covert image comprises steganographic encoding.

7. The system of claim 6, wherein the steganographic encoding comprises a digital watermark.

8. The system of claim 1, further comprising the computer system acting to cause printing of the emphasized image with a thermochromic material, the material changing in appearance with changes in temperature.

9. The system of claim 1, further comprising the computer system acting to cause printing of the emphasized image with a ferrofluid material, the material changing in appearance with changing in applied magnetic field.

10. The system of claim 1, further comprising the computer system acting to cause printing of the emphasized image with an ink that is not visible to humans under ordinary illumination, the material becoming visible when illuminated with infrared illumination.

11. The system of claim 1, further comprising the computer system acting to cause printing of the image, including the one or more emphasized contours but excluding other features of the input digital image, as an element of an identification document.

12. The system of claim 1, further comprising the executable software, when executed by the processor of the computer system, processing the image pixels using a Sobel edge detection algorithm.

* * * * *